United States Patent
Fujii

(10) Patent No.: US 9,634,747 B2
(45) Date of Patent: Apr. 25, 2017

(54) APPARATUS AND METHOD OF PROCESSING SIGNAL, AND RECORDING MEDIUM

(71) Applicant: Samsung Electronics Co., Ltd., Gyeonggi-do (KR)

(72) Inventor: Masaaki Fujii, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/838,227

(22) Filed: Aug. 27, 2015

(65) Prior Publication Data

US 2016/0065257 A1    Mar. 3, 2016

(30) Foreign Application Priority Data

Aug. 27, 2014 (JP) ................. 2014-172546

(51) Int. Cl.
*H04B 7/02* (2006.01)
*H04B 7/0456* (2017.01)
(Continued)

(52) U.S. Cl.
CPC ......... *H04B 7/0456* (2013.01); *H04B 1/1036* (2013.01); *H04B 7/0413* (2013.01);
(Continued)

(58) Field of Classification Search
CPC ..... H04L 27/2626; H04L 1/10; H04L 5/0053; H04L 25/0204; H04L 25/0224;
(Continued)

(56) References Cited

U.S. PATENT DOCUMENTS 9,077,599 B2 * 7/2015 Tomeba ............... H04B 7/0456
2013/0336282 A1 * 12/2013 Nakano ............... H04B 7/0456
                                                                370/330

(Continued)

OTHER PUBLICATIONS

Hochwald, et al.; "A Vector-Perturbation Technique for Near-Capacity Multiantenna Multiuser Communication—Part II: Perturbation"; IEEE-TOC; vol. 53, No. 3, Mar. 2005; 8 pages.

(Continued)

*Primary Examiner* — Janice Tieu

(57) ABSTRACT

Disclosed are an apparatus and a method of processing a signal, and a recording medium. The apparatus for processing a signal includes: an estimating unit configured to estimate a first Signal-to-Interference plus Noise power Ratio (SINR) of a reception signal based on transmission path information based on a result of an estimation of a plurality of transmission paths and noise power notified from a wireless reception device; a signal processing unit configured to generate a first modulation symbol by modulating the information bit obtained based on a first modulation order and a first coding rate determined based on the first SINR on a basis of the first modulation order, and a perturbation addition processing unit configured to search for a perturbation vector based on the first modulation symbol generated for each of the plurality of transmission paths, and add the perturbation vector to the first modulation symbol.

20 Claims, 9 Drawing Sheets

(51) Int. Cl.
*H04L 1/00* (2006.01)
*H04L 1/20* (2006.01)
*H04B 1/10* (2006.01)
*H04B 7/0413* (2017.01)
*H04L 27/26* (2006.01)
*H04B 7/06* (2006.01)
*H04L 5/00* (2006.01)
*H04L 25/02* (2006.01)
*H04B 7/0452* (2017.01)
*H04L 25/03* (2006.01)

(52) U.S. Cl.
CPC ......... *H04B 7/0617* (2013.01); *H04L 1/0003* (2013.01); *H04L 1/0009* (2013.01); *H04L 1/20* (2013.01); *H04B 7/0452* (2013.01); *H04B 7/0632* (2013.01); *H04B 7/0697* (2013.01); *H04L 1/00* (2013.01); *H04L 5/0053* (2013.01); *H04L 25/0204* (2013.01); *H04L 25/0224* (2013.01); *H04L 25/0242* (2013.01); *H04L 27/2626* (2013.01); *H04L 2025/03414* (2013.01); *H04L 2025/03426* (2013.01)

(58) Field of Classification Search
CPC ......... H04L 1/00; H04L 27/00; H04L 1/0003; H04L 2025/03414; H04L 2025/03426; H04L 25/0242; H04L 25/033; H04B 7/0456; H04B 7/0617; H04B 7/0697; H04B 7/0452; H04B 7/0417; H04B 7/0413; H04B 7/0632
See application file for complete search history.

(56) References Cited

U.S. PATENT DOCUMENTS

2015/0098402 A1* 4/2015 Tomeba .................. H04B 7/04
   370/329
2015/0349932 A1* 12/2015 Onodera ............... H04W 16/28
   370/329

OTHER PUBLICATIONS

Peel, et al.; "A Vector-Perturbation Technique for Near-Capacity Multiantenna Multiuser Communication—Part I: Channel Inversion and Regularization"; IEEE-TOC; vol. 53, No. 1; Jan. 2005; 8 pages.

* cited by examiner

|  | Modulation | Coding rate | Rate | Required SNR (dB) |
|---|---|---|---|---|
| 0 | No transmission |  | 0.000 | - |
| 1 | QPSK | 1/2 | 1.000 | 2.1 |
| 2 | QPSK | 2/3 | 1.333 | 4.3 |
| 3 | QPSK | 3/4 | 1.500 | 5.6 |
| 4 | QPSK | 4/5 | 1.600 | 6.1 |
| 5 | QPSK | 6/7 | 1.714 | 7.1 |
| 6 | QPSK | 8/9 | 1.778 | 7.9 |
| 7 | 16QAM | 2/3 | 2.667 | 10.3 |
| 8 | 16QAM | 3/4 | 3.000 | 11.6 |
| 9 | 16QAM | 4/5 | 3.200 | 12.5 |
| 10 | 16QAM | 6/7 | 3.429 | 13.4 |
| 11 | 16QAM | 8/9 | 3.556 | 14.1 |
| 12 | 64QAM | 2/3 | 4.000 | 14.7 |
| 13 | 64QAM | 3/4 | 4.500 | 16.9 |
| 14 | 64QAM | 5/6 | 5.000 | 18.3 |
| 15 | 64QAM | 8/9 | 5.333 | 19.6 |
| 16 | 256QAM | 3/4 | 6.000 | 22.0 |
| 17 | 256QAM | 4/5 | 6.400 | 22.7 |
| 18 | 256QAM | 5/6 | 6.667 | 23.5 |
| 19 | 256QAM | 6/7 | 6.857 | 24.4 |
| 20 | 256QAM | 8/9 | 7.111 | 25.3 |

FIG.8

APPARATUS AND METHOD OF PROCESSING SIGNAL, AND RECORDING MEDIUM

CROSS-REFERENCE TO RELATED APPLICATION AND CLAIM OF PRIORITY

The present application is related to and claims benefit under 35 U.S.C. §119(a) to Japanese Application Serial No. JP2014-172546, which was filed in the Japanese Patent Office on Aug. 27, 2014, the entire content of which is hereby incorporated by reference.

TECHNICAL FIELD

The present disclosure relates to an apparatus and a method for processing a signal, and a recording medium.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, research and technology development have been actively conducted in order to improve a transmission rate or a throughput in a mobile communication scheme. A technology for improving a transmission rate or a throughput in a mobile communication scheme includes a Multiple Input and Multiple Output (MIMO) transmission scheme, in which a plurality of antennas is provided at both sides of a transmission device and a reception device to transceive (that is, simultaneously transceiving a plurality of streams) information through a plurality of transmission paths. Further, there is also a technology called a Multi-User MIMO (MU-MIMO) transmission scheme, which virtually considers a plurality of user terminals simultaneously accessing a transmission device (for example, a base station device) as a large array antenna, and spatial multiplexes a transmission signal (information) transmitted from the transmission device to each user terminal.

In a communication system adopting the MIMO transmission scheme, there is a case where a processing called "precoding" is already performed on a transmission signal in order to suppress interference between signals (that is, interference between different streams) transmitted through different transmission paths. A description of the related art is referred to, for example, Christian B. Peel, et al.: "A Vector-Perturbation Technique for Near-Capacity Multiantenna Multiuser Communication—Part I: Channel Inversion and Regularization" IEEE TRANSACTIONS ON COMMUNICATIONS vol. 53, no. 1, January 2005, pages 195-202 or Bertrand M. Hochwald, et al.: "A Vector-Perturbation Technique for Near-Capacity Multiantenna Multiuser Communication—Part II: Perturbation" IEEE TRANSACTIONS ON COMMUNICATIONS vol. 53. no. 3, March 2005, pages 537-544.

SUMMARY

Examples of precoding processing performed on a transmission signal include Zero Forcing (ZF) beam forming or linear precoding, such as Minimum Mean Square Error (MMSE) beam forming. However, in the linear precoding, when a channel correlation between different streams (that is, between signals transmitted through different transmission paths) is high, there is a case where power required for transmitting a signal is increased, so that when the power is normalized to predetermined transmission power, a gain is decreased, and thus a signal quality deteriorates.

Because of this, a MIMO communication scheme using technology called non-linear precoding, which non-linearly processes a transmission signal by a transmission device and reduces power required for transmitting a signal, has attracted attention. In the MIMO communication scheme using the non-linear precoding, the transmission device adds a perturbation vector to a transmission modulated symbol, in which information that is a transmission target, is modulated, according to a state of a transmission path between the transmission device and a reception device to reduce transmission power required.

In the meantime, when the non-linear precoding technology is used, a coefficient for normalizing power of the transmission signal is dependent on a transmission symbol, so that it is difficult to pre-estimate a gain which is based on the non-linear precoding. That is, a perturbation vector is searched for after coding and modulation mapping are terminated, so that it is difficult to reflect an improvement quantity of the gain according to the addition of the perturbation vector to a selection of a modulation order or a coding rate. That is, in the method using the non-linear precoding technology in the related art, a modulation order or a coding rate is selected by estimating an improvement quantity of a gain according to an addition of a perturbation vector, so that it is difficult to further improve a throughput.

To address the above-discussed deficiencies, it is a primary object to provide an apparatus and a method of processing a signal, and a program, which are capable of reducing required transmission power and further improving a throughput by adding a perturbation vector.

An exemplary embodiment of the present disclosure provides an apparatus for processing a signal, which spatially multiplexes and transmits a transmission signal including an information bit and an error correction code to one or more wireless reception devices from a plurality of antennas through a plurality of transmission paths, the apparatus including: an estimating unit configured to estimate a first Signal-to-Interference plus Noise power Ratio (SINR) of a reception signal based on transmission path information based on a result of an estimation of the plurality of transmission paths and noise power notified from the wireless reception device; a signal processing unit configured to generate a first modulation symbol by modulating the information bit obtained based on a first modulation order and a first coding rate determined based on the first SINR on a basis of the first modulation order; and a perturbation addition processing unit configured to search for a perturbation vector based on the first modulation symbol generated for each of the plurality of transmission paths, and add the perturbation vector to the first modulation symbol, wherein the estimating unit is further configured to estimate a second SINR based on the transmission path information and the first modulation symbol, to which the perturbation vector is added, the signal processing unit is further configured to calculate the error correction code by coding the information bit based on a second coding rate determined based on the second SINR, and generate a second modulation symbol by modulating the error correction code based on a second modulation order determined based on the second SINR, and the perturbation addition processing unit is further configured to search for the perturbation vector based on the second modulation symbol generated for each of the plurality of transmission paths and add the perturbation vector to the second modulation symbol.

When the second modulation order is different from the first modulation order, the signal processing unit is further configured to re-generate a first modulation symbol by modulating the information bit based on the second modulation order.

When the second modulation order is the same as the first modulation order, and the second coding rate is larger than the first coding rate, the signal processing unit is further configured to extend the information bit, generate a new first modulation symbol by adding a modulation symbol generated by modulating an information bit newly added according to the extension based on the first modulation order to the first modulation symbol, and code the extended information bit based on the second coding rate to calculate the error correction code.

The transmission path information is a precoding matrix calculated based on a channel matrix representing the result of the estimation of the plurality of transmission paths.

The perturbation addition processing unit is further configured to search for the perturbation vector for each of the first modulation symbol and the second modulation symbol so that transmission power after precoding is minimal.

The first modulation order and the first coding rate is determined based on a Modulation and Coding Set (MCS) selected based on the first SINR among a plurality of predetermined MCSs, and the second modulation order and the second coding rate is determined based on an MCS selected based on the second SINR among the plurality of MCSs.

The first modulation order and the first coding rate is determined based on the MCS, by which a transmission rate is maximum, among the MCSs, in which the first SINR is equal to or smaller than a required SINR of each MCS, among the MCSs, and the second modulation order and the second coding rate is determined based on the MCS, by which a transmission rate is maximum, among the MCSs, in which the second SINR is equal to or smaller than the required SINR of each MCS, among the MCSs.

The apparatus further includes precoding unit configured to generate the transmission signal by multiplying a modulation symbol vector obtained based on the first modulation symbol and the second modulation symbol, to which the perturbation vectors are added, respectively, by the transmission path information, normalizing a result of the multiplication based on a normalization coefficient calculated based on the modulation symbol vector.

The apparatus further includes a transmitting unit configured to transmit the transmission signal to the wireless reception device from the plurality of antennas through the plurality of transmission paths.

The apparatus further includes the plurality of antennas.

Another exemplary embodiment of the present disclosure provides a method of processing a signal, which spatially multiplexes and transmits a transmission signal including an information bit and an error correction code to one or more wireless reception devices from a plurality of antennas through a plurality of transmission paths, the method including: estimating a first Signal-to-Interference plus Noise power Ratio (SINR) of a reception signal based on transmission path information based on a result of an estimation of the plurality of transmission paths and noise power notified from the wireless reception device; generating a first modulation symbol by modulating the information bit obtained based on a first modulation order and a first coding rate determined based on the first SINR on a basis of the first modulation order, searching for a perturbation vector based on the first modulation symbol generated for each of the plurality of transmission paths, and adding the perturbation vector to the first modulation symbol; estimating a second SINR based on the transmission path information and the first modulation symbol, to which the perturbation vector is added; calculating the error correction code by coding the information bit based on a second coding rate determined based on the second SINR, and generating a second modulation symbol by modulating the error correction code based on a second modulation order determined based on the second SINR; and searching for the perturbation vector based on the second modulation symbol generated for each of the plurality of transmission paths and adding the perturbation vector to the second modulation symbol.

The method further include, when the second modulation order is different from the first modulation order, re-generating a first modulation symbol by modulating the information bit based on the second modulation order.

The method further include, when the second modulation order is the same as the first modulation order, and the second coding rate is larger than the first coding rate, extending the information bit, generating a new first modulation symbol by adding a modulation symbol generated by modulating an information bit newly added according to the extension based on the first modulation order to the first modulation symbol; and coding the extended information bit based on the second coding rate to calculate the error correction code.

The transmission path information is a precoding matrix calculated based on a channel matrix representing the result of the estimation of the plurality of transmission paths.

The perturbation vector is searched for the perturbation vector for each of the first modulation symbol and the second modulation symbol so that transmission power after precoding is minimum.

The first modulation order and the first coding rate is determined based on a Modulation and Coding Set (MCS) selected based on the first SINR among a plurality of predetermined MCSs, and the second modulation order and the second coding rate are determined based on an MCS selected based on the second SINR among the plurality of MCSs.

The first modulation order and the first coding rate is determined based on the MCS, by which a transmission rate is maximum, among the MCSs. in which the first SINR is equal to or smaller than a required SINR of each MCS, among the MCSs. The second modulation order and the second coding rate is determined based on the MCS, by which a transmission rate is maximum, among the MCSs, in which the second SINR is equal to or smaller than the required SINR of each MCS, among the MCSs.

The method further includes generating the transmission signal by multiplying a modulation symbol vector obtained based on the first modulation symbol and the second modulation symbol, to which the perturbation vectors are added, respectively, by the transmission path information, normalizing a result of the multiplication based on a normalization coefficient calculated based on the modulation symbol vector.

The method further includes transmitting the transmission signal to the wireless reception device from the plurality of antennas through the plurality of transmission paths.

Still another exemplary embodiment of the present disclosure provides a computer readable recoding medium, in which instructions set to perform one or more operations by a processor are stored, wherein the one or more operations include: estimating a first Signal-to-Interference plus Noise power Ratio (SINR) of a reception signal based on transmission path information based on a result of an estimation of the plurality of transmission paths and noise power notified from the wireless reception device; generating a first modulation symbol by modulating the information bit obtained based on a first modulation order and a first coding rate determined based on the first SINR on a basis of the first modulation order; searching for a perturbation vector based on the first modulation symbol generated for each of the plurality of transmission paths, and adding the perturbation vector to the first modulation symbol; estimating a second SINR based on the transmission path information and the first modulation symbol, to which the perturbation vector is added; calculating the error correction code by coding the information bit based on a second coding rate determined based on the second SINR, and generating a second modulation symbol by modulating the error correction code based on a second modulation order determined based on the second SINR; and searching for the perturbation vector based on the second modulation symbol generated for each of the plurality of transmission paths and adding the perturbation vector to the second modulation symbol.

According to the present disclosure, it is possible to reduce required transmission power by adding a perturbation vector, and further improving a throughput.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith." as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example for describing an MCS according to various exemplary embodiments of the present disclosure.

DETAILED DESCRIPTION

Figure 1:
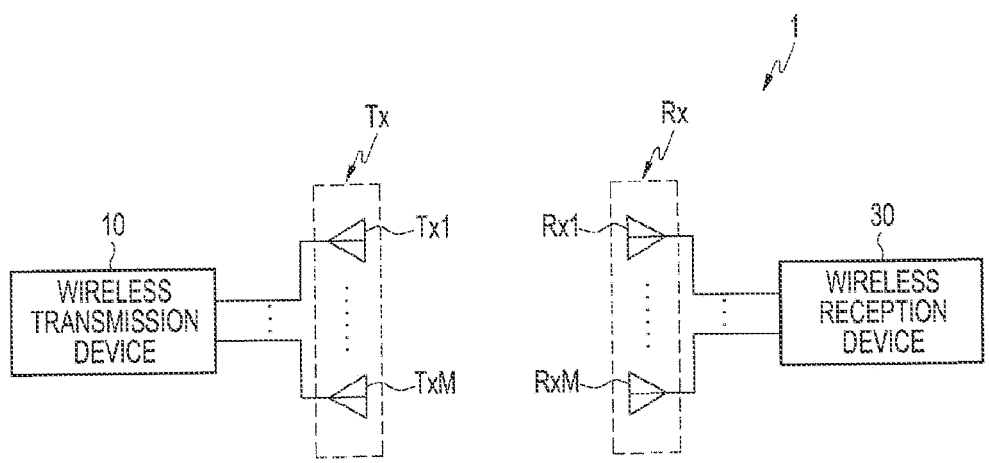
FIG. 1 illustrates a schematic system configuration of a communication system according to various exemplary embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system. Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals are used to designate similar constituent elements.

As used herein, the expression "have," "may have," "include," or "may include" refers to the existence of a corresponding feature (e.g., numeral, function, operation, or constituent element such as component), and does not exclude one or more additional features.

In the present disclosure, the expression "A or B," "at least one of A or/and B," or "one or more of A or/and B" includes all possible combinations of the items listed. For example, the expression "A or B," "at least one of A and B," or "at least one of A or B" refers to all of (1) including at least one A, (2) including at least one B, or (3) including all of at least one A and at least one B.

The expression "a first," "a second," "the first," or "the second" used in various embodiments of the present disclosure modifies various components regardless of the order or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it is directly connected or coupled directly to the other element or any other element (e.g., third element) is interposed between them. In contrast, it is understood that when an element (e.g., first element) is referred to as being "directly connected," or "directly coupled" to another element (second element), there are no elements (e.g., third element) interposed between them.

The expression "configured to" used in the present disclosure is exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" means that the device, together with other devices or components, "is able to." For example, the phrase "processor adapted (or configured) to perform A, B, and C" means a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms include plural forms as well unless the context clearly indicates otherwise. Unless defined otherwise, all terms used herein, including technical terms and scientific terms, have the same meaning as commonly understood by a person of ordinary skill in the art to which the present disclosure pertains. Such terms as those defined in a generally used dictionary are interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

FIG. 1 is a diagram of an example for describing a schematic system configuration of a communication system according to various exemplary embodiments of the present disclosure.

Referring to FIG. 1, a communication system 1 according to various exemplary embodiments of the present disclosure includes a wireless transmission device 10, a transmission antenna set Tx, a reception antenna set Rx, and a wireless reception device 30. The transmission antenna set Tx includes a plurality of transmission antennas Tx1 to TxM. Further, the reception antenna set Rx includes a plurality of reception antennas Rx1 to RxN.

The communication system 1 is a wireless communication system adopting, for example, a Multiple Input and Multiple Output (MIMO) transmission scheme, transceiving a wireless signal between one or more transmission antennas Tx1 to TxM and one or more reception antennas Rx1 to RxN. Further, the communication system 1 according to various exemplary embodiments of the present disclosure is configured as a wireless communication system adopting, for example, a Multiple User MIMO (MU-MIMO) transmission scheme, in which one or more wireless reception devices 30 simultaneously access the wireless transmission device 10.

Further, the communication system 1 according to various exemplary embodiments of the present disclosure, the wireless transmission device 10 pre-performs processing called precoding on a transmission signal in order to suppress interference between signals (that is, interference between different streams) transmitted through different transmission paths.

An example of the precoding processing performed on a transmission signal includes technology called linear precoding or technology called non-linear precoding.

To describe the communication system 1 according to various exemplary embodiments of the present disclosure, an example of a wireless transmission device performing precoding processing on a transmission signal by using linear precoding technology or non-linear precoding technology will be described as a comparative example.

Comparative Example 1

Figure 2:
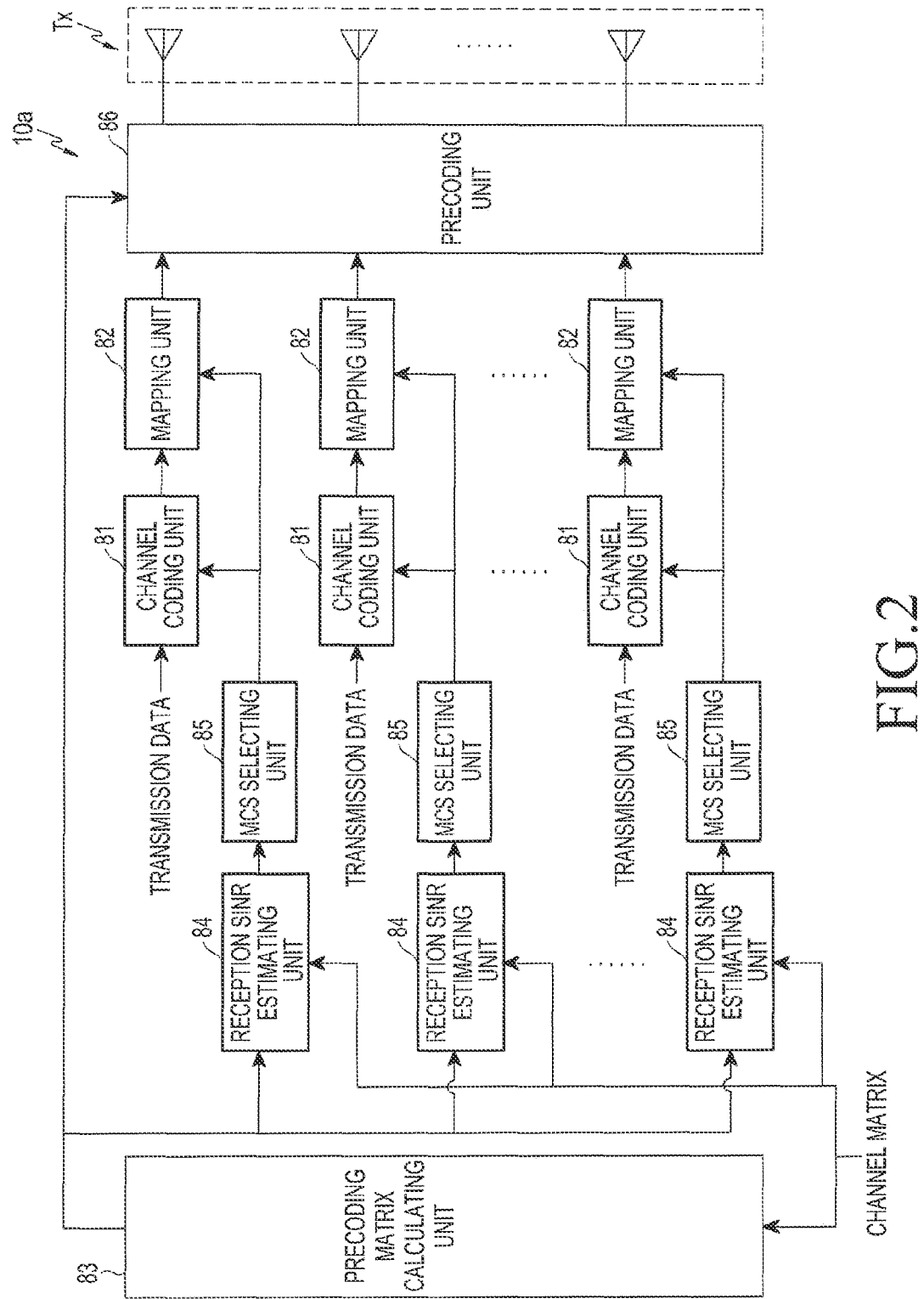
FIG. 2 illustrates one example of a function configuration of a wireless transmission device of Comparative Example 1.

First, as Comparative Example 1, an example of a wireless transmission device performing precoding processing on a transmission signal by using linear precoding technology will be described with reference to FIG. 2. FIG. 2 is a diagram illustrating one example of a function configuration of a wireless transmission device of Comparative Example 1. Further, in a case where the wireless transmission device of Comparative Example 1 is discriminated from the wireless transmission device 10 according to various exemplary embodiments of the present disclosure, there is a case where the wireless transmission device of Comparative Example 1 is expressed by a "wireless transmission device 10a" below.

As illustrated in FIG. 2, a wireless transmission device 10a of Comparative Example 1 includes a channel coding unit 81, a mapping unit 82, a precoding matrix calculating unit 83, a reception Signal to Interference and Noise Ratio (SINR) estimating unit 84, a Modulation and Coding Set (MCS) selecting unit 85, and a precoding unit 86. The wireless transmission device 10a illustrated in FIG. 2 transmits signals of M paths (or types) from M transmission antennas Tx1 to TxM. Accordingly, as illustrated in FIG. 2, in order to process each of the signals of the M paths, in the wireless transmission device 10a, the channel coding unit 81, the mapping unit 82, the reception SINR estimating unit 84, and the MCS selecting unit 85 are provided for each path. Further, the transmission antenna set Tx is embedded in the wireless transmission device 10a or provided outside the wireless transmission device 10a.

The precoding matrix calculating unit 83 obtains an estimation result of a channel matrix H having a transmission function of each transmission path formed between the transmission antenna set Tx and the transmission antenna set Rx as a component.

For example, when the signals of the M paths (M≥2) transmitted from the wireless transmission device 10 are received by using N reception antennas (N≥2), M×N transmission paths exists between the transmission antenna set Tx and the reception antenna set Rx. In certain embodiments, when it is assumed that a transmission function in a case where a signal is transmitted from an $j^{th}$ transmission antenna Txj and received in an $i^{th}$ reception antenna Rxi is $h_{ij}$, a matrix of M rows and M columns having the transmission function $h_{ij}$ as a component (i, j) is a channel matrix H. The channel matrix H is expressed by Equation 1 represented below.

$$H = \begin{pmatrix} h_{11} & \cdots & h_{1M} \\ \vdots & \ddots & \vdots \\ h_{N1} & \cdots & h_{NM} \end{pmatrix} \quad \text{[Equation 1]}$$

The channel matrix H is estimated based on the reception signal by the wireless reception device 30, and also is estimated based on control information fed-back from the wireless reception device 30 by the wireless transmission device 10.

The precoding matrix calculating unit 83 calculates an inverse matrix of the obtained channel matrix H as a precoding matrix W (that is, W=H−1). Further, the precoding matrix calculating unit 83 outputs the calculated precoding matrix W to each of the reception SINR estimating unit 84 and the precoding unit 86.

The reception SINR estimating unit 84 obtains the precoding matrix W from the precoding matrix calculating unit 83. Further, the reception SINR estimating unit 84 obtains the estimated channel matrix H and noise power $\sigma^2$ fed-back from the wireless reception device 30. The reception SINR estimating unit 84 estimates a reception SINR received from the wireless reception device 30 based on the obtained precoding matrix W and channel matrix H, and the noise power $\sigma^2$. A principle of processing for estimating an SINR of the reception signal by the reception SINR estimating unit 84 will be described below.

For example, when it is assumed that a modulation symbol vector, in which transmission data is a modulated, is s, transmission power is P, and the precoding matrix is W=H−1, a transmission signal vector z is expressed by Equation 2 represented below.

$$z = \sqrt{P/\gamma_{ZF}} W s \quad \text{[Equation 2]}$$

Further, $\gamma_{ZF}$ is a normalization coefficient (hereinafter, referred to as an "average transmission power normalization coefficient" for making average transmission power uniform, and is expressed by Equation 3 represented below.

$$\gamma_{ZF} = E\|Ws\|^2 \quad \text{[Equation 3]}$$

In certain embodiments, when Equation 3 is set to Equation 4 represented below, the average transmission power normalization coefficient $\gamma_{ZF}$ is expressed by Equation 5 represented below.

$$E\|s\|^2 = 1 \quad \text{[Equation 4]}$$

$$\gamma_{ZF} = \|W\|_F^2 \quad \text{[Equation 5]}$$

Further, in the right side of Equation 5, a norm attached with a subscript latter F represents a Frobenius norm. That is, the right side of Equation 5 represents two squares of the Frobenius norm of the precoding matrix W.

In certain embodiments, when a noise vector of the power $\sigma^2$ is n, a reception signal vector r is assumed as Equation 6 represented below.

$$r = Hz + n \quad \text{[Equation 6]}$$

Further, the precoding matrix W is an inverse matrix of the channel matrix H, so that it is assumed that the reception signal vector r is expressed by Equation 7 based on Equation 6 and Equation 2.

$$r = \sqrt{P/\gamma_{ZF}} s + n \quad \text{[Equation 7]}$$

Accordingly, the reception SINR estimating unit 84 estimates an SINR $\rho$ dB of the reception signal based on Equation 8 represented below based on transmission power P, an average transmission power normalization coefficient $\gamma_{ZF}$, and noise power $\sigma^2$.

$$\rho = 10\log_{10} \frac{P}{\gamma_{ZF} \sigma^2} \quad \text{[Equation 8]}$$

Further, the reception SINR estimating unit 84 outputs an SINR $\rho$ of the estimated reception signal to the MCS selecting unit 85.

The MCS selecting unit 85 obtains an estimation result of the SINR $\rho$ of the reception signal from the reception SINR estimating unit 84. Further, the MCS selecting unit 85 compares a plurality of predetermined MCSs with the obtained estimation result of the SINR $\rho$, and selects an MCS having higher transmission efficiency (that is, a higher throughput) among the MCSs allowing the estimated SINR $\rho$.

Further, the MCS is control information, in which a modulation order and a coding rate, with which information that is a transmission target (hereinafter, referred to as "transmission data") is modulated and coded when the transmission data is transmitted as a transmission signal, is pre-associated with a reception quality allowed when the transmission signal based on the modulation order and the coding rate is transmitted. Examples of the modulation order include QPSK, 16QAM, 64QAM, and 256QAM.

When the MCS is selected as described above, the MCS selecting unit 85 outputs a coding rate associated in the selected MCS to the channel coding unit 81, and a modulation order associated in the MCS to the mapping unit 82.

The channel coding unit 81 obtains transmission data for each path transmitted to the wireless reception device 30 and codes the obtained transmission data based on the coding rate notified from the MCS selecting unit 85. The channel coding unit 81 outputs the coded transmission data to the mapping unit 82.

The mapping unit 82 obtains the coded transmission data from the channel coding unit 81 and maps each bit among the obtained coded transmission data to a modulation symbol based on the modulation order notified from the MCS selecting unit 85. Further, the mapping unit 82 outputs the modulation symbol, to which each bit among the transmission data is mapped, to the precoding unit 86. As described above, the modulation symbol, to which each bit of the coded transmission data is mapped, is output from each mapping unit 82 to the precoding unit 86.

The precoding unit 86 obtains the modulated modulation symbol for each path from each mapping unit 82. The precoding unit 86 obtains a modulation symbol vector s (that is, a transmission symbol vector s) based on the obtained modulation symbol for each path. Further, the precoding unit 86 obtains the precoding matrix W calculated based on the estimated channel matrix H from the precoding matrix calculating unit 83.

The precoding unit 86 obtains a transmission signal vector z by multiplying the modulation symbol vector s by the precoding matrix W, and normalizing the multiplication result to an average transmission power normalization coefficient $\gamma_{ZF}$ calculated based on the precoding matrix W. Further, the method of calculating the average transmission power normalization coefficient $\gamma_{ZF}$ has been described based on Equations 3 to 5. Accordingly, the linear precoding processing is performed on the transmission signal.

The transmission signal vector z, that is, the transmission signals of the M paths, obtained as described above is transmitted to the wireless reception device 30 as a Radio Frequency (RF) signal by each of the transmission antennas Tx1 to TxM of the transmission antenna set Tx. Further, in this case, the transmission signal is transmitted to the wireless reception device 30 after, for example, being frequency-converted into a signal of a predetermined wireless frequency band.

Further, the wireless reception device 30 receives, for example, the wireless signals of the M paths transmitted through the transmission antenna set Tx through the reception antenna set Rx. The wireless reception device 30 filters each of the obtained RF signals into a predetermined band for each reception path, and converts a base band signal by amplifying and frequency converting the filtered signal. Further, the wireless reception device 30 demodulates the base band signal and obtains transmission data transmitted from the wireless transmission device 10*a* to the wireless reception device 30.

As Comparative Example 1, an example of the wireless transmission device 10*a* performing precoding processing on a transmission signal by using the linear precoding technology has been described with reference to FIG. 2.

As described above, the wireless transmission device 10*a* according to Comparative Example 1 calculates an SINR ρ dB of a reception signal based on a precoding matrix W calculated based on an estimation result of a channel matrix H and selects an MCS based on the SINR ρ. Through the configuration, the wireless transmission device 10*a* according to Comparative Example 1 selects a modulation order and a coding rate having higher transmission efficiency according to a state of a transmission path between the transmission antenna set Tx and the reception antenna set Rx.

In the meantime, the linear precoding technology is a scheme based on a calculation of an inverse matrix of the channel matrix H, so that when a channel correlation between the plurality of streams is high, a weight vector for each stream of the calculated precoding matrix W has a relatively large value. Accordingly, when the channel correlation between the plurality of streams is high, transmission power is increased, and when the transmission power is normalized to predetermined transmission power, a gain is decreased, so that a signal quality of a reception side is degraded.

Comparative Example 2

Figure 3:
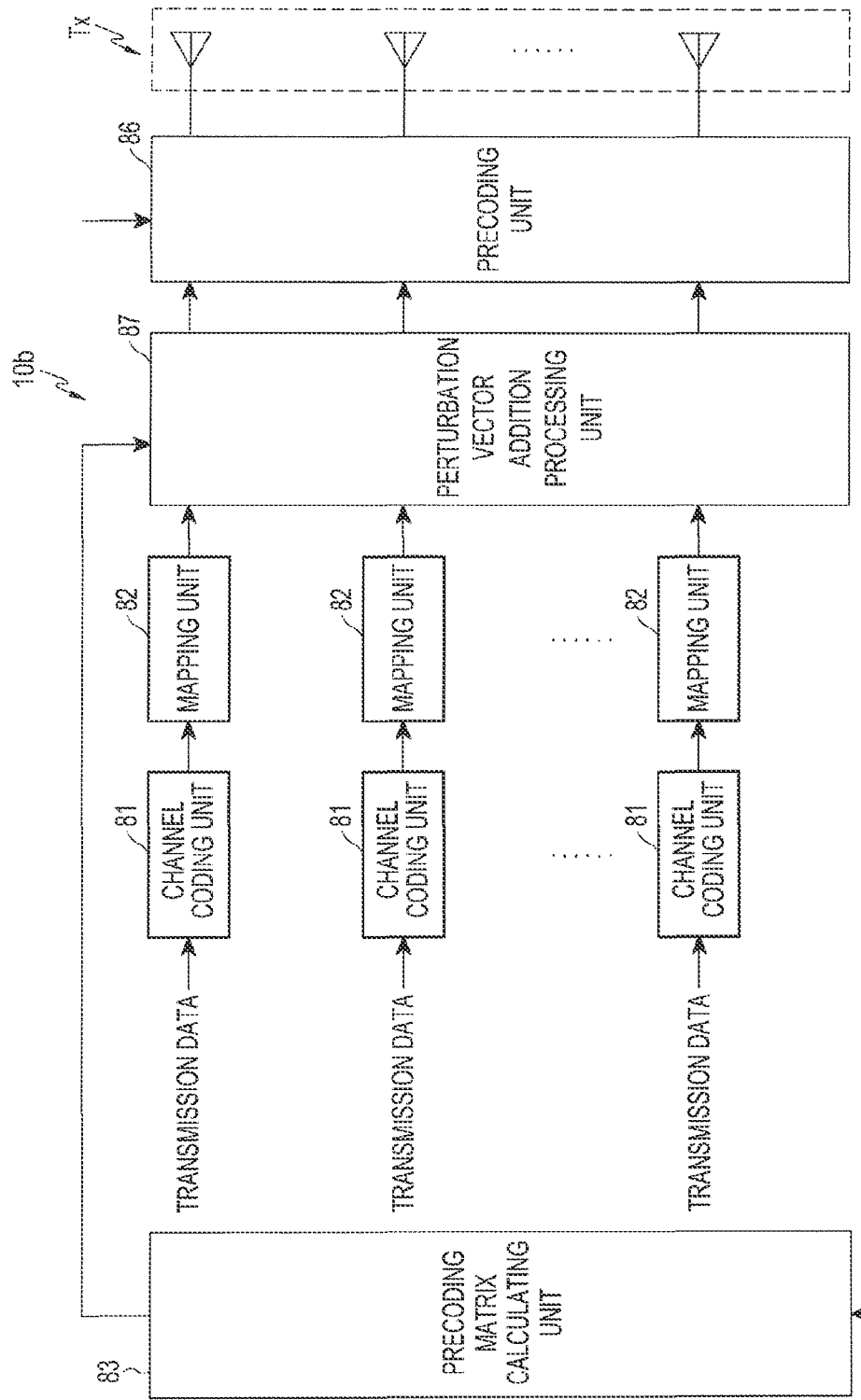
FIG. 3 illustrates one example of a function configuration of a wireless transmission device of Comparative Example 2.

Next, as Comparative Example 2, as an example of a wireless transmission device using the non-linear precoding technology, an example of a wireless transmission device performing precoding processing on a transmission signal by using a Vector Perturbation (VP) method will be described with reference to FIG. 3. FIG. 3 is a block diagram illustrating one example of a function configuration of a wireless transmission device of Comparative Example 2. Further, in a case where the wireless transmission device of Comparative Example 2 is discriminated from the wireless transmission device 10 according to the present exemplary embodiment, there is a case where the wireless transmission device of Comparative Example 2 is expressed by a "wireless transmission device 10*b*" below.

As illustrated in FIG. 3, a wireless transmission device 10*b* of Comparative Example 2 includes a channel coding unit 81, a mapping unit 82, a precoding matrix calculating unit 83, a perturbation vector addition processing unit 87, and a precoding unit 86. Further, the wireless transmission device 10*b* illustrated in FIG. 3 transmits signals of M paths through M transmission antennas Tx1 to TxM similar to the aforementioned wireless transmission device 10*a* (see FIG. 2) according to Comparative Example 1. Accordingly, as illustrated in FIG. 3, in order to process each of the signals of the M paths, the wireless transmission device 10*b* includes the channel coding unit 81 and the mapping unit 82 for each path. Further, the transmission antenna set Tx is embedded in the wireless transmission device 10*b* or provided outside the wireless transmission device 10*b*.

The precoding matrix calculating unit 83 obtains an estimation result of a channel matrix H, and calculate an inverse matrix of the obtained channel matrix H as a precoding matrix W (that is, W=H−1) equally to aforementioned Comparative Example 1. The precoding matrix calculating unit 83 outputs the calculated precoding matrix W to the perturbation vector addition processing unit 87 and the precoding unit 86.

The channel coding unit 81 obtains transmission data for each path transmitted (or to be transmitted) to the wireless reception device 30 and codes the obtained transmission data based on a predetermined coding rate. The channel coding unit 81 outputs the coded transmission data to the mapping unit 82.

The mapping unit 82 obtains the coded transmission data from the channel coding unit 81 and maps each bit among the obtained coded transmission data to a modulation symbol based on a predetermined modulation order. The mapping unit 82 outputs the modulation symbol, to which each bit among the transmission data is mapped, to the perturbation vector addition processing unit 87. As described above, the modulation symbol, to which each bit of the coded transmission data is mapped, is output from the mapping unit 82 to the perturbation vector addition processing unit 87.

The perturbation vector addition processing unit 87 obtains a modulation symbol modulated for each path from the mapping unit 82. The perturbation vector addition processing unit 87 obtains a modulation symbol vector s based on the obtained modulation symbol for each path. Further, the perturbation vector addition processing unit 87 obtains the precoding matrix W calculated based on the estimated channel matrix H from the precoding matrix calculating unit 83.

The perturbation vector addition processing unit 87 searches for a perturbation vector, at which total transmission power after precoding is minimum, among perturbation vector candidates predetermined based on the obtained modulation symbol vector s and the precoding matrix W. The perturbation vector addition processing unit 87 adds the found perturbation vector to the modulation symbol vector s.

Figure 4:
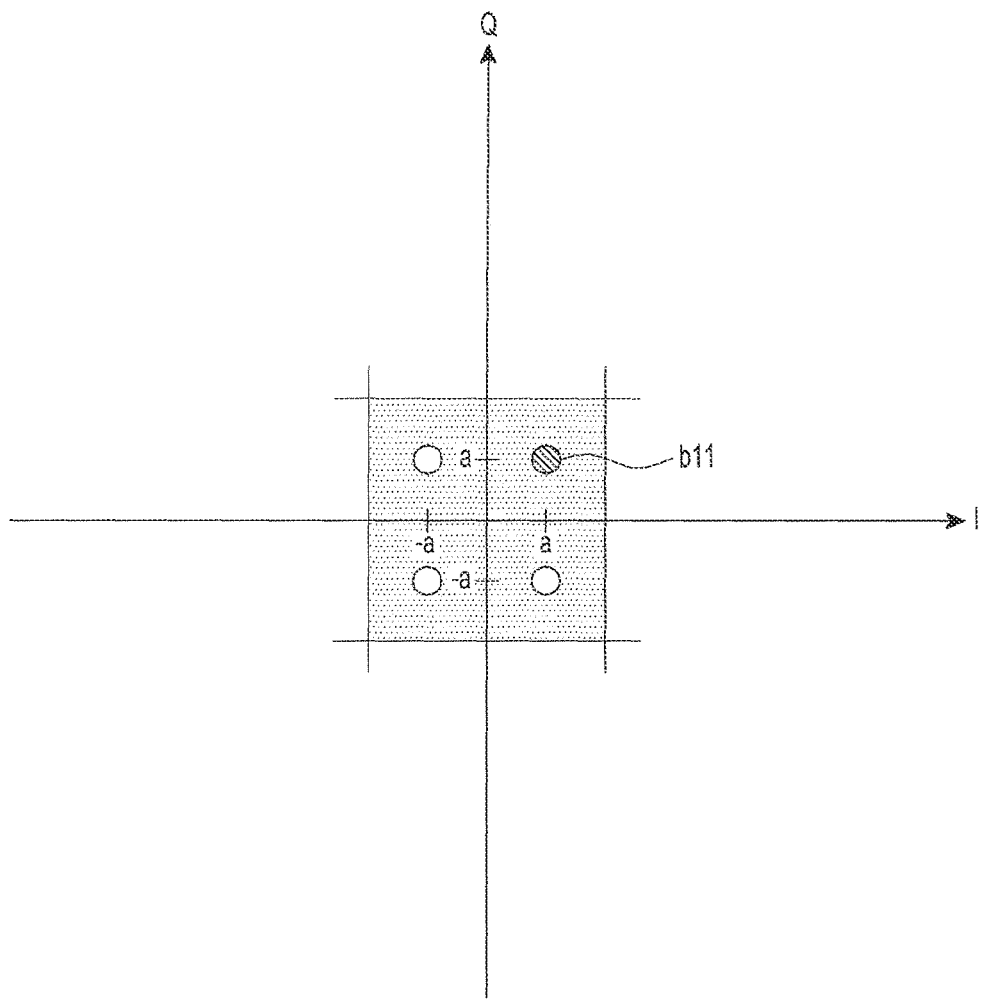
FIGS. 4, 5, and 6 illustrate examples for describing processing about a search for and an addition of a perturbation vector according to various embodiments of the present disclosure.
Figure 5:
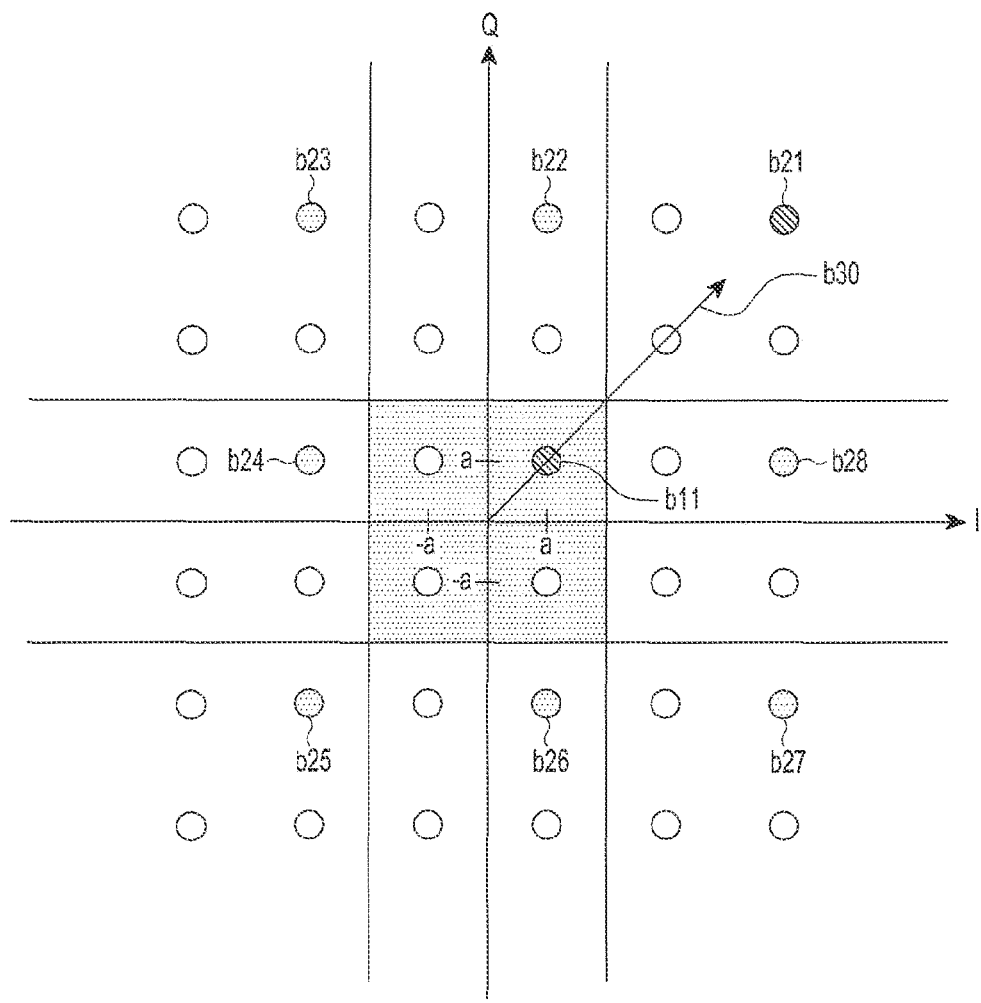
Figure 6:
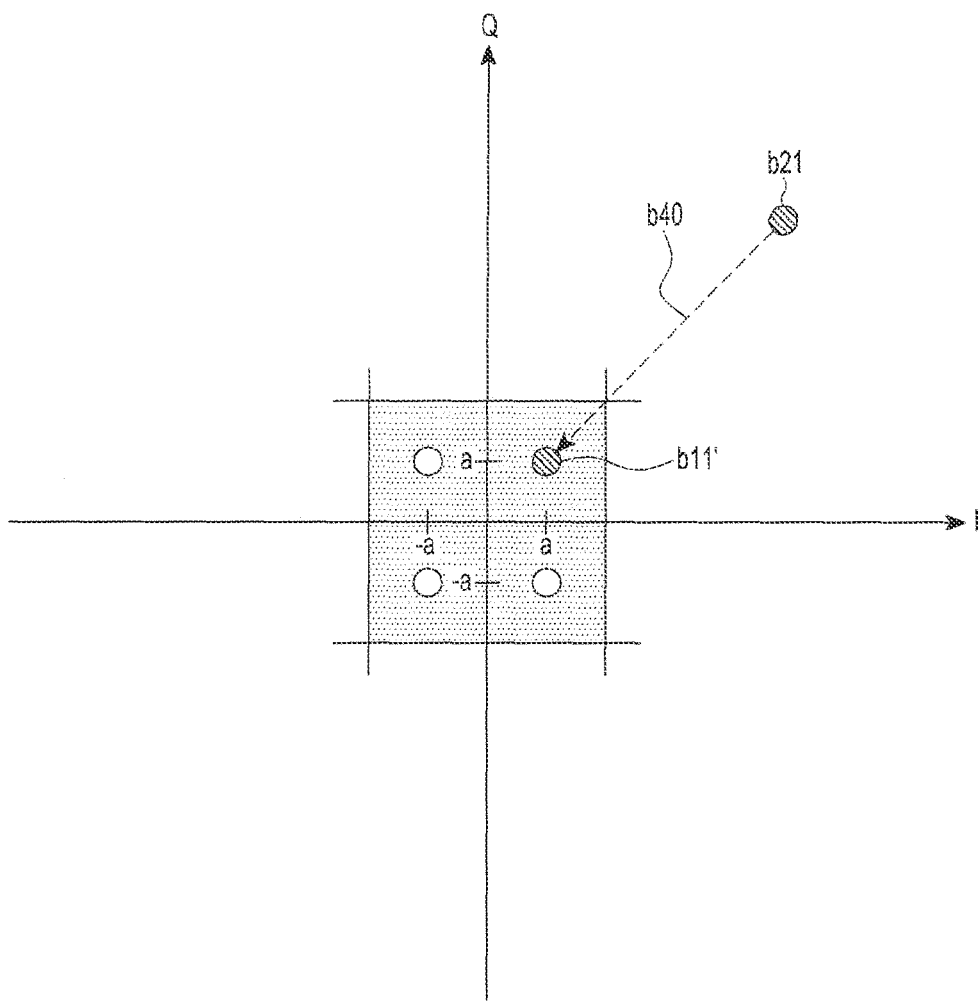

Processing by the perturbation vector addition processing unit 87 with, for example, a perturbation variation τl in a case where the QPSK (=±a±ja) is performed on a modulation signal before perturbation will be described with reference to FIGS. 4 to 6. FIGS. 4 to 6 are diagrams of an example for describing processing about a search for and an addition of a perturbation vector. Further, τ configuring a perturbation variation is a constant regulating a size of perturbation. Further, l configuring the perturbation variation is a complex integer.

For example, FIG. 4 illustrates an example of a transmission symbol in a case where the QPSK is performed on a modulation signal before perturbation. Further, an example of a case where a perturbation vector is added to a transmission symbol (a+ja) denoted by reference numeral b11 in FIG. 4 will be described in association with FIG. 4.

For example, FIG. 5 illustrates an example, in a case of, in τ=4a, a relation of a transmission symbol and enlarged signal points which are candidates when a perturbation vector is added to the transmission symbol. Further, for the QPSK, a candidate of l is {−1−j, −1+j0,−1+j, 0−j, 0+j0, 0+j, 1−j, 1+j0, 1+j}, and the number C of candidates of l is 9. Accordingly, when a perturbation vector is added to the transmission symbol b11 illustrated in FIG. 5, the transmission symbol b11 and the enlarged signal points denoted by reference numerals b21 to b28 is a candidate of the transmission symbol to which the perturbation symbol is added.

For example, when the perturbation vector is τ(1+j) as represented by reference numeral b30 of FIG. 5 and the perturbation vector is added to the transmission symbol b11, a position of the enlarged signal point denoted by reference numeral b21 is a position of the transmission symbol b11 after the addition of the perturbation vector.

Accordingly, when the number of streams is M, the number of candidates of the perturbation vector is CM, and the perturbation vector addition processing unit 87 searches for a perturbation vector, at which total transmission power after precoding is minimum, among the candidates of the perturbation vector based on Equation 9 below.

$$l = \underset{l'}{\mathrm{argmin}} E\|W(s+\tau l')\|^2 \qquad \text{[Equation 9]}$$

When an average transmission power normalization coefficient when the found perturbation vector is added is $\Gamma_{VP}$, the average transmission power normalization coefficient $\gamma_{VP}$ is expressed by Equation 10 represented below.

$$\gamma_{VP} = E\|W(s+\tau l)\|^2\| \qquad \text{[Equation 10]}$$

Further, the average transmission power normalization coefficient $\gamma_{VP}$ is the same as or smaller than the average transmission power normalization coefficient $\gamma_{ZF}$ obtained when the ZF precoding aforementioned based on Equation 3 is performed. That is, the addition of the perturbation vector to the transmission symbol improves power transmission efficiency.

Accordingly, the perturbation vector addition processing unit 87 searches for a perturbation vector and adds the found perturbation vector to the modulation symbol vector s. The perturbation vector addition processing unit 87 outputs the modulation symbol vector s, to which the perturbation vector is added, to the precoding unit 86.

The precoding unit 86 obtains the modulation symbol vector s, to which the perturbation vector is added, from the perturbation vector addition processing unit 87. The precoding unit 86 obtains a transmission signal vector z by multiplying the modulation symbol vector s by the precoding matrix W, and normalizing the multiplication result to an average transmission power normalization coefficient $\gamma_{VF}$ based on Equation 10. For example, the transmission signal vector z is expressed by Equation 11 represented below.

$$z = \sqrt{P/\gamma_{VP}} W(s+\tau l) \qquad \text{[Equation 11]}$$

The transmission signal vector z, that is, the non-linear precoding processed transmission signals of the M paths, obtained as described above is transmitted to the wireless reception device 30 as a Radio Frequency (RF) signal by each of the transmission antennas Tx1 to TxM of the transmission antenna set Tx. According to various exemplary embodiments of the present disclosure, the transmission signal also is, for example, converted into a signal of a predetermined wireless frequency band, and transmitted to the wireless reception device 30.

The reception signal vector r received by the wireless reception device 30 is expressed by Equation 12 represented below.

$$r = \sqrt{P/\gamma_{VP}}(s+\tau l)+n \qquad \text{[Equation 12]}$$

The wireless reception device 30 normalizes the reception signal vector r obtained through Equation 12 into a reception gain. In certain embodiments, when it is assumed that a reception signal vector after the normalization is r', the reception signal vector r' after the normalization is expressed by Equation 13 represented below. Further, n' represents a noise.

$$r' = s+\tau l+n' \qquad \text{[Equation 13]}$$

The wireless reception device 30 removes influence of the perturbation vector and restores a transmission symbol by applying a modulo operation to each factor of the reception signal vector r' after the normalization with an integer τ regulating a size of perturbation. For example, the processing of an $m^{th}$ stream is expressed by Equation 14 represented below.

$$\hat{s}_m = \left\{\left(s_m + \tau l_m + n'_m + \frac{1+j}{2}\tau\right) \bmod \tau\right\} - \frac{1+j}{2}\tau = s_m + n''_m \qquad \text{[Equation 14]}$$

$S_m$hat ("^" is attached at an upper side of S) represented at the left side of Equation 14 represents a transmission symbol after restoration corresponding to the $m^{th}$ stream.

FIG. 6 schematically illustrates processing by the wireless reception device 30 receiving a transmission symbol b21 after the perturbation vector is added in a case where the transmission symbol b21 illustrated in FIG. 5 after the perturbation vector is added is transmitted by the wireless transmission device 10. In this case, the wireless reception device 30 applies a modulo operation with τ=4a on the received symbol b21 as represented by reference numeral b40, and removes an influence of a perturbation vector b30 illustrated in FIG. 5 and restores a transmission symbol b11'.

The wireless reception device 30 demodulates the transmission symbol obtained as described above and obtains transmission data transmitted from the wireless transmission device 10b to the wireless reception device 30.

As Comparative Example 2, an example of the wireless transmission device 10b performing precoding processing on a transmission signal by using the non-linear precoding technology has been described with reference to FIG. 3.

As described in Comparative Example 1, when the linear precoding technology is used, the average transmission power normalization coefficient $\gamma_{ZF}$ is determined based on the channel matrix H and the precoding matrix W derived from the channel matrix H, and the noise power $\sigma^2$ fed-back from the wireless reception device 30. Through the configuration, the wireless transmission device 10a of Comparative Example 1 easily selects an MCS, thereby executing coding and modulation mapping based on the selected MCS.

As described in Comparative Example 2, when the non-linear precoding technology based on the addition of the perturbation vector is used, the average transmission power normalization coefficient $\gamma_{VP}$ is dependent on the transmission symbol, so that it is difficult to pre-estimate a gain by the non-linear precoding. That is, the wireless transmission device 10b of Comparative Example 2 searches for a perturbation vector after the coding and the modulation mapping are terminated, so that it is difficult to reflect an improvement quantity of the gain according to the addition of the perturbation vector to the selection (that is, the selection of a modulation order and coding) of the MCS. Accordingly, when the non-linear precoding technology based on the addition of the perturbation vector is used, an error rate is decreased, but there are considerable cases where an increase in a throughput is very small compared to the case where the linear precoding is used.

The communication system 1 according to the exemplary embodiment of the present disclosure is conceived to solve the problems. As the communication system 1 according to the exemplary embodiment of the present disclosure, a structure capable of reducing transmission power required by an addition of a perturbation vector and improving a throughput will be described below.

Particularly, the wireless transmission device 10 according to the present exemplary embodiment first selects an MCS based on the linear precoding technology. The wireless transmission device 10 maps only a prior information bit between an information bit and an error correction sign (for example, a parity bit, hereinafter, is referred to as a "parity bit") transmitted as transmission signals to a modulation symbol based on the selected MCS, and search for a perturbation vector based on the modulation symbol.

The wireless transmission device 10 calculates an SINR of a reception signal improved by an addition of a perturbation vector based on the non-linear precoding technology which is based on an addition of a perturbation vector, from the result of the search for perturbation vector. The wireless transmission device 10 re-selects the MCS based on a result of the calculation of the SINR of the improved reception signal, generates a parity bit based on the re-selected MCS, and modulates and maps the parity bit.

According to the configuration, the wireless transmission device 10 according to the exemplary embodiment of the present disclosure reduces transmission power required by the addition of a perturbation vector and improves a throughput by reflecting an improvement quantity of a gain according to the addition of the perturbation vector to the selection of the MCS. Further, hereinafter, the communication system 1 according to the exemplary embodiment of the present disclosure will be described in more detail in association with, particularly, the wireless transmission device 10.

<2. Function Configuration>

Figure 7:
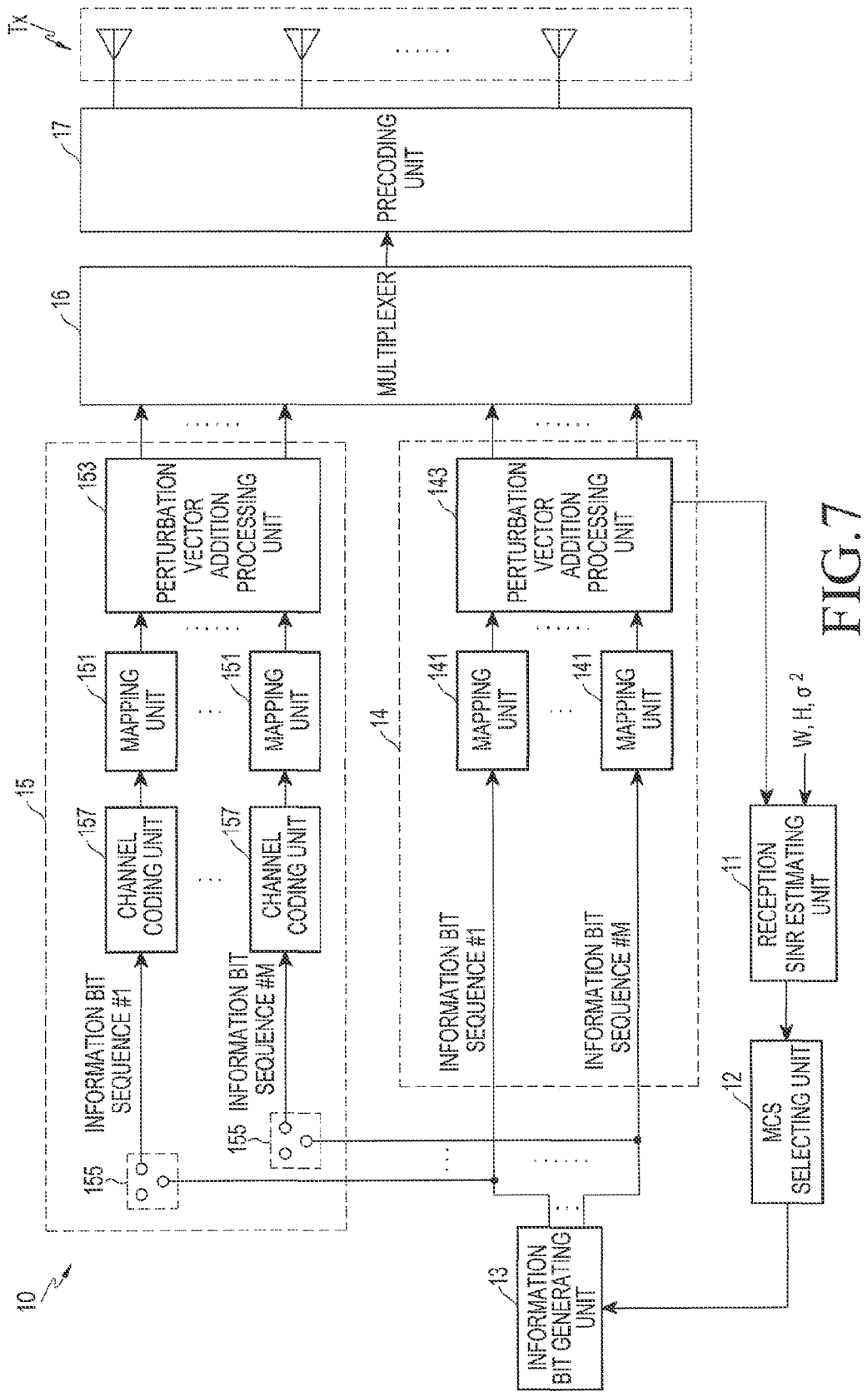
FIG. 7 illustrates an example for describing a wireless transmission device according to various exemplary embodiments of the present disclosure.

A function configuration of the wireless transmission device 10 according to the exemplary embodiment of the present disclosure will be described with reference to FIG. 7. FIG. 7 is a diagram of an example illustrating a function configuration of the wireless transmission device 10 according to the present exemplary embodiment.

As illustrated in FIG. 7, the wireless transmission device 10 according to the exemplary embodiment of the present disclosure includes a reception SINR estimating unit 11, an MCS selecting unit 12, an information bit generating unit 13, an information bit processing unit 14, an error correction coding processing unit 15, a multiplexer 16, and a precoding unit 17. The information bit processing unit 14 includes a mapping unit 141 and a perturbation vector addition processing unit 143. The error correction coding processing unit 15 includes a switching unit 155, a channel coding unit 157, a mapping unit 151, and a perturbation vector addition processing unit 153. Further, in the information bit processing unit 14, the mapping unit 141 is provided for each path in order to process each of signals of M paths. In the error correction coding processing unit 15, in order to process each of the signals of the M paths, the switching unit 155, the channel coding unit 157, and the mapping unit 151 is provided for each system.

The configuration of the wireless transmission device 10 according to the exemplary embodiment of the present disclosure is divided into "processing based on an MCS selected based on the linear precoding technology" and "processing based on an MCS re-selected according to an addition of a perturbation vector," and the configuration operated in each processing will be described.

(Processing Based on an MCS Selected Based on the Linear Precoding Technology)

The wireless transmission device 10 will be described based on processing from selecting an MCS based on the linear precoding technology, mapping only an information bit to a modulation symbol based on the selected MCS, to searching for a perturbation vector based on the modulation symbol.

The reception SINR estimating unit 11 obtains an estimated channel matrix H, a precoding matrix W (that is, W=H−1) calculated based on the channel matrix H, and noise power $\sigma^2$ fed-back from the wireless reception device 30. Further, an obtainment resource of each element of information is the same as that of the aforementioned wireless transmission device 10a of Comparative Example 1.

The reception SINR estimating unit 11 calculates an average transmission power normalization coefficient $\gamma_{ZF}$ based on the obtained precoding matrix W and aforementioned Equation 5. The reception SINR estimating unit 11 estimates an SINR $\rho_{ZF}$ dB of a reception signal based on the calculated average transmission power normalization coefficient $\gamma_{ZF}$ and transmission power p based on Equation 15 represented below. Further, for convenience of the description, it is assumed that noise power of each stream is the same.

$$\rho_{ZF} = 10\log_{10}\frac{P}{\gamma_{ZF}\sigma^2} \quad [\text{Equation 15}]$$

The reception SINR estimating unit 11 outputs an SINR $\rho_{ZF}$ of the reception signal estimated based on the average transmission power normalization coefficient $\gamma_{ZF}$, the noise power $\sigma^2$, and the transmission power P to the MCS selecting unit 12. Further, the estimated SINR $\rho_{ZF}$ of the reception signal corresponds to one example of "a first reception SINR".

The MCS selecting unit 12 obtains the SINR $\rho_{ZF}$ of the reception signal estimated based on the average transmission power normalization coefficient $\gamma_{ZF}$, the noise power $\sigma^2$, and the transmission power P from the reception SINR estimating unit 11. The MCS selecting unit 12 compares a plurality of predetermined MCSs with the obtained SINR $\rho^{ZF}$, and selects an MCS having higher transmission efficiency (that is, a higher throughput) among the MCSs allowing the SINR $\rho_{ZF}$.

A control table d10 illustrated in FIG. 8 represents an example of the predetermined MCSs. As represented in FIG. 8, a modulation order d12 and a coding rate d13 are set in each MCS, and a transmission rate d14 and a required Signal Noise Ratio (SNR) d15 in a case where the modulation order d12 and the coding rate d13 are applied, are associated with each MCS. Further, the required SNR d15 represents an SNR required for securing a predetermined communication quality (for example, in order to make a packet error rate be equal to or smaller than a predetermined value). Further, the example illustrated in FIG. 8 represents a relative value of a transmission rate, in which the transmission rate d14 is "1.000" in a case where the modulation order d12 is "QPSK" and the coding rate d13 is "1/2". Further, an index d11 is set in each MCS as identification information for identifying each MCS.

For example, the MCS selecting unit 12 selects an MCS, in which the obtained SINR $\rho_{ZF}$ of the reception signal is equal to or larger than the required SNR d15 set in each MCS and the transmission rate d14 is at a maximum, with reference to the control table d10 illustrated in FIG. 8.

As a particular exemplary embodiment, when the SINR $\rho_{ZF}$ is 7.0 dB, the MCS selecting unit 12 extracts an MCS, in which the required SNR d15 is equal to or smaller than 7.0 dB, that is, the MCSs with the indexes dl represented with "1" to "4". The MCS selecting unit 12 selects the MCS, by which the transmission rate d14 is maximum, among the extracted MCSs, that is, the MCS with the index d11 represented with "4". Further, in this case, "QPSK" is set as the modulation order, and "4/5" is set as the coding rate.

Accordingly, the MCS selecting unit 12 selects an MCS based on the obtained SINR $\rho_{ZF}$ of the reception signal, and output the selected MCS (that is, the modulation order and the coding rate) to the information bit generating unit 13.

The information bit generating unit 13 obtains the selected MCS from the MCS selecting unit 12 based on the SINR $\rho_{ZF}$. The information bit generating unit 13 calculates a bit length of a coding bit (that is, information bit+parity bit) based on the modulation order set in the obtained MCS and calculates a bit length of information bit in the coding bit based on the coding rate set in the MCS.

When the bit length of the information bit is calculated, the information bit generating unit 13 reads transmission data that is a transmission target according to the bit length of the information bit, and generates information bit sequences of M paths based on the read transmission data. The information bit generating unit 13 outputs each of the information bit sequences of the M paths and the modulation order set in the obtained MCS to the mapping unit 141 of the information bit processing unit 14 for each path.

The mapping unit 141 obtains the generated information bit sequence for each path and the modulation order from the information bit generating unit 13. The mapping unit 141 maps each bit in the obtained information bit sequence for each path to the modulation symbol based on the obtained modulation order. The mapping unit 141 outputs the modulation symbol, to which each bit in the information bit sequence for each path is mapped, to the perturbation vector addition processing unit 143. Further, the modulation symbol, to which each bit in the information bit sequence is mapped, corresponds to an example of "a first modulation symbol".

The perturbation vector addition processing unit 143 obtains a modulation symbol, in which the information bit sequence for each path is modulated, from each mapping unit 141. In certain embodiments, when a symbol length of the modulation symbol, in which the information bit sequence for each path is modulated, is Ns, the perturbation vector addition processing unit 143 obtains an M-dimensional modulation symbol vector ss, of which the symbol length is Ns, based on the modulation symbol, in which the information bit sequence for each path is modulated. When it is assumed that a $k^{th}$ transmission symbol is s(k) (1≤k≤Ns, k is an integer), the M-dimensional modulation symbol vector ss, of which the symbol length is Ns, is expressed by Equation 16 represented below.

$$s_s = \{s(k)\}_{k=1}^{Ns} \qquad \text{[Equation 16]}$$

The perturbation vector addition processing unit 143 obtains the precoding matrix W calculated based on the estimated channel matrix H. As long as the perturbation vector addition processing unit 143 is capable of obtaining the precoding matrix W, the obtainment resource of the precoding matrix W is not particularly limited. For example, the perturbation vector addition processing unit 143 obtains the precoding matrix W from the reception SINR estimating unit 11, or the same obtainment resource, from which the reception SINR estimating unit 11 obtains the precoding matrix W.

The perturbation vector addition processing unit 143 searches for a perturbation vector, at which total transmission power after the precoding is minimum, among predetermined perturbation vector candidates based on the obtained modulation symbol vector ss and precoding matrix W. The perturbation vector addition processing unit 143 adds the found perturbation vector to the modulation symbol vector ss. Further, the processing for searching for the perturbation vector and the processing for adding the perturbation vector to the modulation symbol vector ss by the perturbation vector addition processing unit 143 is the same as those of the aforementioned wireless transmission device 10b of Comparative Example 2.

The M-dimensional modulation symbol vector ss, to which the perturbation vector is added, is referred to as an "M-dimensional modulation symbol vector ss'" hereinafter. In certain embodiments, when the perturbation vector found for the $k^{th}$ transmission symbol s(k) is τl(k), the M-dimensional modulation symbol vector ss', to which the perturbation vector is added over the number Ns of symbols corresponding to the information bit length is expressed by Equation 17 represented below.

$$s_s' = \{s(k)+\tau l(k)\}_{k=1}^{Ns} \qquad \text{[Equation 17]}$$

The perturbation vector addition processing unit 143 outputs an M-dimensional modulation symbol vector ss', to which the perturbation vector is added over the number Ns of symbols corresponding to the information bit length, to the reception SINR estimating unit 11. Accordingly, the reception SINR estimating unit 11 calculates the average transmission power normalization coefficient $\gamma_{VP}$ based on the M-dimensional modulation symbol vector ss', to which the perturbation vector is added. Further, this will be described in detail in a subsequent item.

(Processing Based on an MCS Re-Selected According to an Addition of a Perturbation Vector)

Processing of calculating, by the wireless transmission device 10, an SINR of a reception improved according to an addition of a found perturbation vector, re-selecting an MCS based on a result of the calculation, and simultaneously modulating and mapping an error correction code based on the re-selected MCS will be described.

The reception SINR estimating unit 11 obtains the M-dimensional modulation symbol vector ss', to which the perturbation vector is added, over the number Ns of symbols corresponding to the information bit length, from the perturbation vector addition processing unit 143 of the information bit processing unit 14. The reception SINR estimating unit 11 calculates an average transmission power normalization coefficient $\gamma_{VP}$ based on the VP method based on the obtained M-dimensional modulation symbol vector ss' and the previously obtained precoding matrix W. In certain embodiments, the average transmission power normalization coefficient $\gamma_{VP}$ is expressed by Equation 18 represented below.

$$\gamma_{VP} = \frac{1}{N_s} \sum_{k=1}^{N_s} \|W(s_k + \tau l_k)\|^2 \qquad \text{[Equation 18]}$$

The reception SINR estimating unit 11 estimates an SINR $\rho_{VP}$ dB improved according to the addition of the perturbation vector based on the calculated average transmission power normalization coefficient $\gamma_{VP}$, the previously obtained noise power $\sigma^2$ and transmission power p based on Equation 19 represented below.

$$\rho_{VP} = 10\log_{10} \frac{P}{\gamma_{VP}\sigma^2} \qquad \text{[Equation 19]}$$

The wireless transmission device 10 according to the exemplary embodiment of the present disclosure obtains the SINR $\rho_{VP}$ estimated as described above as a prediction value of the SINR of the reception signal including an improvement quantity of a gain according to the addition of the perturbation vector for the entire coding bits.

The SINR estimating unit 11 estimates the SINR $\rho_{VP}$ of the reception signal based on the average transmission power normalization coefficient $\gamma_{VP}$, the noise power $\sigma^2$, and the transmission power P, and output the SINR $\rho_{VP}$ to the MCS selecting unit 12. Further, the estimated SINR $\rho_{VP}$ of the reception signal corresponds to one example of "a second reception SINR".

The MCS selecting unit 12 obtains the SINR $\rho_{VP}$ of the reception signal estimated based on the average transmission power normalization coefficient $\gamma_{VP}$, the noise power $\sigma^2$, and the transmission power P from the reception SINR estimating unit 11. The MCS selecting unit 12 compares the plurality of predetermined MCSs with the obtained SINR $\rho_{VP}$, and re-selects an MCS having higher transmission efficiency (that is, a higher throughput) among the MCSs allowing the SINR $\rho_{VP}$.

The MCS selecting unit 12 outputs the MCS re-selected based on the obtained SINR $\rho_{VP}$ of the reception signal to the information bit generating unit 13.

The information bit generating unit 13 obtains the re-selected MCS from the MCS selecting unit 12 based on the SINR $\rho_{VP}$. The information bit generating unit 13 compares the re-selected MCS (that s, the MCS re-selected based on the SINR $\rho_{VP}$) with the previously selected MCS (that is, the MCS selected based on the SINR $\rho_{ZF}$). Further, in certain embodiments, subsequent processing by the information bit generating unit 13 is varied according to whether the modulation orders set in each MCS are different from each other between the re-selected MCS and the previously obtained MCS. Accordingly, the subsequent processing by the information bit generating unit 13 will be described based on "a case where the modulation orders are different from each other" and "a case where the modulation orders are the same as each other" below.

(In a Case where the Modulation Orders are Different from Each Other)

First, a case where the modulation orders set in each MCS between the re-selected MCS and the previously selected MCS are different from each other, that is, the modulation order is updated according to the re-selection of the MCS will be described.

When the modulation order is updated according to the re-selection of the MCS, the information bit generating unit 13 re-calculates a bit length of the coding bit (that is, information bit+parity bit) based on the modulation order set in the re-selected MCS. Further, the information bit generating unit 13 re-calculates a bit length of the information bit in the coding bit based on the coding rate set in the MCS. Further, a bit length of the parity bit also is determined by the determination of the bit length of the information bit.

When a bit length of the information bit is re-calculated, the information bit generating unit 13 reads transmission data that is a transmission target according to the bit length of the information bit, and re-generate information bit sequences of M paths based on the read transmission data. The information bit generating unit 13 outputs each of the re-generated information bit sequences of the M paths and the modulation order set in the re-selected MCS to the mapping unit 141 of the information bit processing unit 14 for each path.

Further, in certain embodiments, the mapping unit 141 re-maps each bit in the re-generated information bit sequence for each path to the modulation symbol based on the obtained modulation order, and output the modulation symbol to the perturbation vector addition processing unit 143.

Further, the perturbation vector addition processing unit 143 obtains a modulation symbol, in which the information bit sequence for each path is modulated, from each mapping unit 141 and executes processing for the aforementioned search for the perturbation vector and addition of the perturbation vector based on the M-dimensional modulation symbol vector ss based on the modulation symbol. Further, the perturbation vector addition processing unit 143 outputs an M-dimensional modulation symbol vector ss', to which the perturbation vector is added, to the multiplexer 16.

The information bit generating unit 13 switches a state of the switching unit 155 to an on-state according to the re-selection of the MCS and outputs each of the generated information bit sequences of the M paths and the coding rate set in the re-selected MCS to the channel coding unit 157 of the error correction code processing unit 15 for each path. An operation of each configuration of the error correction coding processing unit 15 will be described together with "a case where the modulation orders are the same as each other."

(In a Case where the Modulation Orders are the Same as Each Other)

Next, a case where the modulation orders set in each MCS between the re-selected MCS and the previously selected MCS are the same as each other, that is, the modulation order is not updated according to the re-selection of the MCS will be described.

When the modulation order is not updated according to the re-selection of the MCS, the information bit generating unit 13 confirms whether the previous coding rate is updated to a higher coding rate according to the re-selection of the MCS.

When the previous coding rate is updated to a higher coding rate, under a condition, in which the coding bit length is uniform (for example, when the modulation order is not changed), a bit length of the information bit based on the coding rate after the update is larger than the bit length of the previously generated information bit (that is, the information bit based on the coding rate before the update). Accordingly, the information bit generating unit 13 re-calculates the bit length of the information bit in the coding bit and extends the previous generated information bit based on the calculated bit length. The information bit generating unit 13 outputs each of the extended information bit sequences of the M paths to the mapping unit 141 of the information bit processing unit 14 for each path.

Further, in certain embodiments, the mapping unit 141 maps only each bit of extended information bits in the extended information bit sequence for each path to the modulation symbol based on the previously obtained modulation order.

Further, the mapping unit 141 may have already mapped other bits other than the extended information bits in the extended information bit sequence for each path to the modulation symbol based on the previous processing. Accordingly, the mapping unit 141 adds the modulation symbol, in which each bit of the extended information bits is modulated, to the modulation symbols corresponding to other already mapped bits other than the extended information bits.

The mapping unit 141 outputs a series of modulation symbols, in which a modulation symbol obtained by modulating each bit of the extended information bit is added to the modulation symbols corresponding to other already mapped bits other than the extended information bit to the perturbation vector addition processing unit 143.

Further, the perturbation vector addition processing unit 143 obtains a modulation symbol, in which the information bit sequence for each path is modulated, from each mapping unit 141 and executes processing for the aforementioned search for the perturbation vector and addition of the perturbation vector based on the M-dimensional modulation symbol vector ss based on the modulation symbol. Further, in certain embodiments, the perturbation vector addition processing unit 143 searches for the perturbation vector only for the modulation symbol obtained by modulating each bit of the extended information bits, among the modulation symbols, in which the information bit sequence is modulated and uses the perturbation vector found based on the previous processing for the modulation symbols obtained by modulating other bits other than the extended information bit.

The perturbation vector addition processing unit 143 outputs the M-dimensional modulation symbol vector ss', to which the perturbation vector is added, to the multiplexer 16.

The information bit generating unit 13 switches a state of the switching unit 155 to an on-state according to the re-selection of the MCS, and output each of the generated information bit sequences of the M paths, and the modulation order and the coding rate set in the re-selected MCS to the channel coding unit 157 of the error correction code processing unit 15 for each path.

Next, the processing of each configuration of the error correction code processing unit 15 will be described. Each of the information bit sequences of the M paths, and the modulation order and the coding rate set in the re-selected MCS is output from the information bit generating unit 13 to the channel coding unit 157 of the error correction code processing unit 15 for each path. In certain embodiments, when the modulation order is updated according to the re-selection of the MCS, the information bit sequences of the M paths generated based on the modulation order after the update is output to the channel coding unit 157 from the information bit generating unit 13 for each path. Further, when the information bit sequence is extended according to the re-selection of the MCS, the information bit sequences of the M paths after the extension is output to the channel coding unit 157 from the information bit generating unit 13 for each path.

The channel coding unit 157 codes the obtained information bit sequence based on the obtained coding rate and generates a parity bit sequence for each path. Further, the channel coding unit 157 outputs the generated parity bit sequence for each path and the obtained modulation order to the mapping unit 151.

The mapping unit 151 obtains the generated parity bit sequence for each path and the obtained modulation order from the channel coding unit 157. The mapping unit 151 maps each bit in the obtained parity bit sequence for each path to the modulation symbol based on the obtained modulation order. The mapping unit 151 outputs the modulation symbol, to which each bit in the parity bit sequence for each path is mapped, to the perturbation vector addition processing unit 153. Further, the modulation symbol, to which each bit in the parity bit sequence is mapped, corresponds to an example of "a second modulation symbol".

The perturbation vector addition processing unit 153 obtains the modulation symbol, in which the parity bit sequence for each path is modulated, from each mapping unit 151. In certain embodiments, when a symbol length of the modulation symbol, in which the parity bit sequence for each path is modulated, is Np, the perturbation vector addition processing unit 143 obtains an M-dimensional modulation symbol vector sp, of which the symbol length is Np, based on the modulation symbol, in which the parity bit sequence for each path is modulated.

The perturbation vector addition processing unit 153 obtains the precoding matrix W calculated based on the estimated channel matrix H. As long as the perturbation vector addition processing unit 153 is capable of obtaining the precoding matrix W equally to the aforementioned perturbation vector addition processing unit 143, the obtainment resource of the precoding matrix W is not particularly limited.

The perturbation vector addition processing unit 153 searches for a perturbation vector, at which total transmission power after the precoding is minimum, among predetermined perturbation vector candidates based on the obtained modulation symbol vector sp and precoding matrix W. The perturbation vector addition processing unit 153 adds the found perturbation vector to the modulation symbol vector sp. Further, the processing for searching for the perturbation vector and the processing for adding the perturbation vector to the modulation symbol vector sp by the perturbation vector addition processing unit 153 is the same as those of the aforementioned wireless transmission device 10b of Comparative Example 2. Further, the M-dimensional modulation symbol vector sp, to which the perturbation vector is added, is referred to as an "M-dimensional modulation symbol vector sp'" hereinafter.

The perturbation vector addition processing unit 153 outputs an M-dimensional modulation symbol vector sp', to which the perturbation vector is added, to the multiplexer 16.

Next, each configuration of a rear end of the multiplexer 16 will be described. The multiplexer 16 obtains the M-dimensional modulation symbol vector ss', to which the perturbation vector is added, based on the modulation symbol, in which each bit of the information bit sequence is modulated, from the perturbation vector addition processing unit 143 of the information bit processing unit 14. Further, the multiplexer 16 obtains the M-dimensional modulation symbol vector sp', to which the perturbation vector is added, based on the modulation symbol, in which each bit of the parity bit sequence is modulated, from the perturbation vector addition processing unit 153 of the error correction coding processing unit 15.

The multiplexer 16 multiplexes the M-dimensional modulation symbol vector ss' and the M-dimensional modulation symbol vector sp' and outputs the M-dimensional modulation symbol vector s after the multiplexing to the precoding unit 17. Further, the M-dimensional modulation symbol vector s after the multiplexing corresponds to the M-dimensional modulation symbol vector based on the modulation symbol, in which each bit of each of the information bit sequence and the parity bit sequence is modulated.

The precoding unit 17 obtains the M-dimensional modulation symbol vector s based on the modulation symbol, in which each bit of each of the information bit sequence and the parity bit sequence is modulated, from the multiplexer 16.

The precoding unit 17 calculates an average transmission power normalization coefficient $\gamma'_{VP}$ based on the VP on the basis of the obtained M-dimensional modulation symbol vector s and precoding matrix W. Further, an obtainment resource of the precoding matrix W is the same as those of the perturbation vector addition processing units 143 and 153.

In certain embodiments, it is assumed that a symbol length of a modulation symbol corresponding to the information bit sequence before the extension is Ns, a symbol length of a modulation symbol corresponding to the information bit sequence of the extension portion is Ns', and a symbol length of a modulation symbol corresponding to the parity bit sequence is Np.

In certain embodiments, the modulation symbol vector ss based on the modulation symbol, to which the information bit sequence before the extension is applied, is calculated based on Equation 16. Further, the M-dimensional modulation symbol vector ss' obtained by adding the perturbation vector to the modulation symbol vector is calculated based on Equation 17.

Further, the modulation symbol vector s based on the modulation symbol, to which each bit of the information bit sequence of the extension portion and the parity bit sequence are mapped, is expressed by Equation 20 represented below.

$$s = \{s(k)\}_{k=1}^{Ns'+Np} \quad \text{[Equation 20]}$$

The M-dimensional modulation symbol vector s' obtained by adding the perturbation vector to the modulation symbol vector s represented in Equation 20 is expressed by Equation 21 represented below.

$$s' = \{s(k)+\tau l(k)\}_{k=1}^{Ns'+Np} \quad \text{[Equation 21]}$$

Based on the above, the precoding unit 17 calculates the average transmission power normalization coefficient $\gamma'_{VP}$ based on Equation 22 represented below.

$$\gamma'_{VP} = \frac{1}{N_s + N'_s + N_p} \quad \text{[Equation 22]}$$

$$\left\{ \sum_{k=1}^{N_s} \|W(s_k + \tau l_k)\|^2 + \sum_{k=1}^{N'_s+N_p} \|W(s_{N_s+k} + \tau l_{N_s+k})\|^2 \right\}$$

Similar to the case where the modulation order is updated, so that the information bit sequence is generated again, when the bit of the information bit sequence has not been extended, it is designated that Ns'=0 in Equation 22.

When the modulation order is not updated according to the re-selection of the MCS, the precoding unit 17 uses the average transmission power normalization coefficient $\gamma_{VP}$ previously calculated by the reception SINR estimating unit 11 based on Equation 18 when calculating the average transmission power normalization coefficient $\gamma'_{VP}$. In certain embodiments, the precoding unit 17 reduces a processing load for the calculation of a first term within a parenthesis in the right side of Equation 22.

As described above, when the precoding unit 17 calculates the average transmission power normalization coefficient $\gamma'_{VP}$, the precoding unit 17 obtains a transmission signal vector z(k) by multiplying the obtained M-dimensional modulation symbol vector s by the precoding matrix W, and normalizing the multiplication result to the average transmission power normalization coefficient $\gamma'_{VP}$. For example, the transmission signal vector z(k) is expressed by Equation 23 represented below.

$$z(k) = \sqrt{\frac{P}{\gamma'_{VP}}} W[s(k) + \tau l(k)] \quad \text{[Equation 23]}$$

The transmission signal vector z(k) obtained as described above, that is, the precoding processed transmission signals of the M paths, is transmitted to the wireless reception device 30 as the RF signals by the transmission antennas Tx1 to TxM of the transmission antenna set Tx, respectively. In certain embodiments, the transmission signal is converted into, for example, a signal of a predetermined wireless frequency band, and transmitted to the wireless reception device 30.

In the above, the example of the function configuration of the wireless transmission device 10 according to the exemplary embodiment of the present disclosure has been described with reference to FIG. 7. Further, in the example illustrated in FIG. 7, it is illustrated that the transmission antenna set Tx is the configuration of the part of the wireless transmission device 10, but the transmission antenna set Tx is provided outside the wireless transmission device 10. Further, the element precoding the transmission signal and the element transmitting the transmission signal after the precoding processing through the transmission antenna set Tx in the wireless transmission device 10 also is configured as different devices. In certain embodiments, the element precoding the transmission signal corresponds to an example of a "signal processing device".

<3. Processing>

Figure 9:
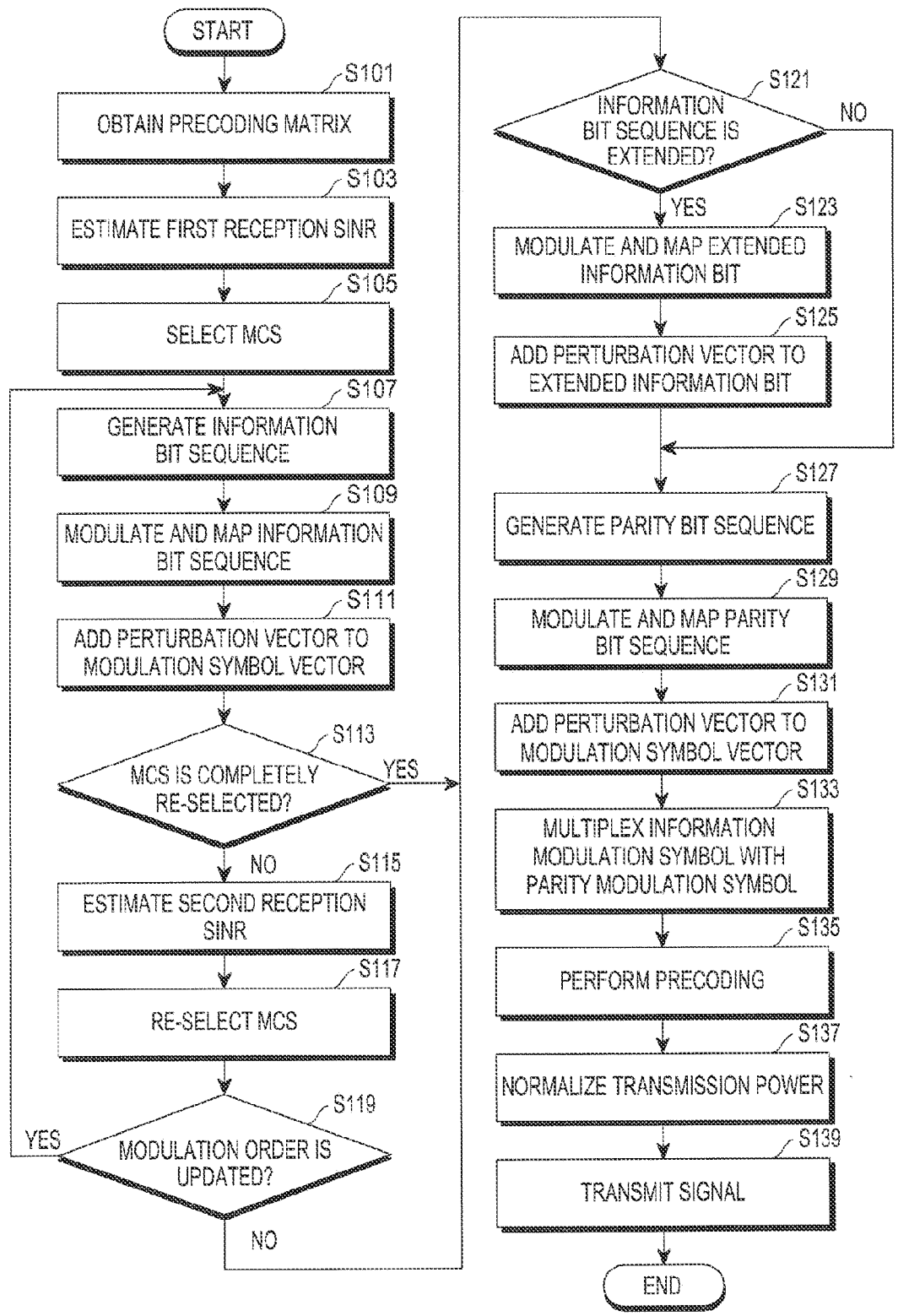
FIG. 9 illustrates an example for describing function(s) or operation(s) performed by the wireless transmission device according to various exemplary embodiments of the present disclosure.

Next, an example of a series of operations of the wireless transmission device 10 according to the exemplary embodiment of the present disclosure has been described with reference to FIG. 9. FIG. 9 is a diagram of an example for describing a series of operations of the wireless transmission device 10 according to an exemplary embodiment of the present disclosure.

In operation S101, the reception SINR estimating unit 11 obtains an estimated channel matrix H, a precoding matrix W (that is, W=H−1) calculated based on the channel matrix H, and noise power $\sigma^2$ fed-back from the wireless reception device 30. Further, an obtainment resource of each element of information is the same as that of the aforementioned wireless transmission device 10a of Comparative Example 1.

In operation S103, the reception SINR estimating unit 11 calculates an average transmission power normalization coefficient $\gamma_{ZF}$ based on the obtained precoding matrix W and aforementioned Equation 5. Further, the reception SINR estimating unit 11 estimates an SINR $\rho_{ZF}$ dB of a reception signal based on the calculated average transmission power normalization coefficient $\gamma_{ZF}$, and the obtained noise power $\sigma^2$ and transmission power p based on aforementioned Equation 15. Further, the reception SINR estimating unit 11 outputs the SINR $\rho_{ZF}$ of the reception signal estimated based on the average transmission power normalization coefficient $\gamma_{ZF}$, the noise power $\sigma^2$, and the transmission power P to the MCS selecting unit 12. Further, the estimated SINR $\rho_{ZF}$ of the reception signal corresponds to one example of "a first reception SINR".

In operation S105, the MCS selecting unit 12 obtains the SINR $\rho_{ZF}$ of the reception signal estimated based on the average transmission power normalization coefficient $\gamma_{ZF}$, the noise power $\sigma^2$, and the transmission power P from the reception SINR estimating unit 11. Further, the MCS selecting unit 12 compares a plurality of predetermined MCSs with the obtained SINR $\rho_{ZF}$ and selects an MCS having higher transmission efficiency (that is, a higher throughput) among the MCSs allowing the SINR $\rho_{ZF}$. The MCS selecting unit 12 outputs the selected MCS (that is, a modulation order and a coding rate) to the information bit generating unit 13.

In operation S107, the information bit generating unit 13 obtains the selected MCS from the MCS selecting unit 12 based on the SINR $\rho_{ZF}$. The information bit generating unit 13 calculates a bit length of a coding bit (that is, information bit+parity bit) based on a modulation order set in the obtained MCS and calculates a bit length of an information bit in the coding bit based on a coding rate set in the MCS.

When the bit length of the information bit is calculated, the information bit generating unit 13 reads transmission data that is a transmission target according to the bit length of the information bit and generates information bit sequences of M paths based on the read transmission data. Further, the information bit generating unit 13 outputs each of the generated information bit sequences of the M paths and the modulation order set in the obtained MCS to the mapping unit 141 of the information bit processing unit 14 for each path.

In operation S109, the mapping unit 141 obtains the generated information bit sequence for each path and the modulation order from the information bit generating unit 13. The mapping unit 141 maps each bit in the obtained information bit sequence for each path to a modulation symbol based on the obtained modulation order. Further, the mapping unit 141 outputs the modulation symbol, to which each bit in the information bit sequence for each path is mapped, to the perturbation vector addition processing unit 143.

In operation S111, the perturbation vector addition processing unit 143 obtains a modulation symbol, in which the information bit sequence for each path is modulated, from each mapping unit 141. In certain embodiments, when a symbol length of the modulation symbol, in which the information bit sequence for each path is modulated, is Ns, the perturbation vector addition processing unit 143 obtains an M-dimensional modulation symbol vector ss, of which the symbol length is Ns, based on the modulation symbol, in which the information bit sequence for each path is modulated. Further, the perturbation vector addition processing unit 143 obtains the precoding matrix W calculated based on the estimated channel matrix H.

The perturbation vector addition processing unit 143 searches for a perturbation vector, at which total transmission power after the precoding is minimum, among predetermined perturbation vector candidates based on the obtained modulation symbol vector sp and precoding matrix W. The perturbation vector addition processing unit 143 adds the found perturbation vector to the modulation symbol vector ss.

The perturbation vector addition processing unit 143 outputs an M-dimensional modulation symbol vector ss', to which the perturbation vector is added over the number Ns of symbols corresponding to the information bit length, to the reception SINR estimating unit 11.

In operation S115, the reception SINR estimating unit 11 obtains the M-dimensional modulation symbol vector ss'. to which the perturbation vector is added over the number Ns of symbols corresponding to the information bit length, from the perturbation vector addition processing unit 143 of the information bit processing unit 14 (Step S113, NO). The reception SINR estimating unit 11 calculates an average transmission power normalization coefficient $\gamma_{VP}$ based on the VP method based on the obtained M-dimensional modulation symbol vector ss' and the previously obtained precoding matrix W. Further, the average transmission power normalization coefficient $\gamma_{VP}$ is calculated based on aforementioned Equation 18.

The reception SINR estimating unit 11 estimates an SINR $\rho_{VP}$ dB improved according to the addition of the perturbation vector based on the calculated average transmission power normalization coefficient $\gamma_{VP}$, the previously obtained noise power $\sigma^2$ and transmission power p based on aforementioned Equation 19. The reception SINR estimating unit 11 outputs the estimated SINR $\rho_{VP}$ to the MCS selecting unit 12. Further, the estimated SINR $\rho_{VP}$ of the reception signal corresponds to one example of "a second reception SINR."

In operation S117, the MCS selecting unit 12 obtains the SINR $\rho_{VP}$ of the reception signal estimated based on the average transmission power normalization coefficient $\gamma_{VP}$, the noise power $\sigma^2$, and the transmission power P from the reception SINR estimating unit 11. The MCS selecting unit 12 compares the plurality of predetermined MCSs with the obtained SINR $\rho_{VP}$ and re-selects an MCS having higher transmission efficiency (that is, a higher throughput) among the MCSs allowing the SINR $\rho_{VP}$. The MCS selecting unit 12 outputs the MCS re-selected based on the obtained SINR $\rho_{VP}$ of the reception signal to the information bit generating unit 13.

In operation S107, when the modulation order is updated according to the re-selection of the MCS in operation S119, the information bit generating unit 13 re-calculates a bit length of the coding bit (that is, information bit+parity bit) based on the modulation order set in the re-selected MCS. The information bit generating unit 13 re-calculates a bit length of the information bit in the coding bit based on the coding rate set in the MCS.

When the bit length of the information bit is re-calculated, the information bit generating unit 13 reads transmission data that is a transmission target according to the bit length of the information bit and re-generates an information bit sequence of M paths based on the read transmission data. Further, the information bit generating unit 13 outputs each of the re-generated information bit sequences of the M paths and the modulation order set in the re-selected MCS to the mapping unit 141 of the information bit processing unit 14 for each path.

In operation S109, the mapping unit 141 re-maps each bit in the re-generated information bit sequence for each path to the modulation symbol based on the obtained modulation order, and output the modulation symbol to the perturbation vector addition processing unit 143.

In operation S111, the perturbation vector addition processing unit 143 obtains a modulation symbol, in which the information bit sequence for each path is modulated, from each mapping unit 141 and executes processing for the aforementioned search for the perturbation vector and addition of the perturbation vector based on the M-dimensional modulation symbol vector ss based on the modulation symbol. The perturbation vector addition processing unit 143 output the M-dimensional modulation symbol vector ss', to which the perturbation vector is added, to the multiplexer 16 in operation S113.

In operation S123, when the modulation order is not updated according to the re-selection of the MCS, the information bit generating unit 13 confirms whether the previous coding rate is updated to a higher coding rate according to the re-selection of the MCS.

When the previous coding rate is updated to the higher coding rate in operation S121, the information bit generating unit 13 re-calculates the bit length of the information bit in the coding bit, and extend the previous generated information bit based on the calculated bit length. The information bit generating unit 13 outputs each of the extended information bit sequences of the M paths to the mapping unit 141 of the information bit processing unit 14 for each path.

Further, in certain embodiments, the mapping unit 141 maps only each bit of extended information bits in the extended information bit sequence for each path to the modulation symbol based on the previously obtained modulation order.

Further, the mapping unit 141 includes already mapped other bits other than the extended information bit in the extended information bit sequence for each path to the modulation symbol based on the previous processing. Accordingly, the mapping unit 141 adds the modulation symbol obtained by modulating each bit of the extended information bits is modulated, to the modulation symbols corresponding to other already mapped bits other than the extended information bit.

The mapping unit 141 outputs a series of modulation symbols, in which the modulation symbol is obtained by modulating each bit of the extended information bits to the modulation symbols corresponding to other already mapped bits other than the extended information bits to the perturbation vector addition processing unit 143.

In operation S125, the perturbation vector addition processing unit 143 obtains a modulation symbol, in which the information bit sequence for each path is modulated, from each mapping unit 141 and executes processing for the aforementioned search for the perturbation vector and addition of the perturbation vector based on the M-dimensional modulation symbol vector ss based on the modulation symbol. Further, in certain embodiments, the perturbation vector addition processing unit 143 searches for the perturbation vector only for the modulation symbol, in which each bit of the extended information bits is modulated, among the modulation symbols, in which the information bit sequence is modulated, and uses the perturbation vector found based on the previous processing for the modulation symbols, in which other bits other than the extended information bit are modulated.

The perturbation vector addition processing unit 143 outputs the M-dimensional modulation symbol vector ss', to which the perturbation vector is added, to the multiplexer 16.

In operation S127, the information bit generating unit 13 switches a state of the switching unit 155 to an on-state according to the re-selection of the MCS and outputs each of the generated information bit sequences of the M paths, and the modulation order and the coding rate set in the re-selected MCS to the channel coding unit 157 of the error correction code processing unit 15 for each path.

The channel coding unit 157 codes the obtained information bit sequence based on the obtained coding rate and generates a parity bit sequence for each path. Further, the channel coding unit 157 outputs the generated parity bit sequence for each path and the obtained modulation order to the mapping unit 151.

In operation S129, the mapping unit 151 obtains the generated parity bit sequence for each path and the obtained modulation order from the channel coding unit 157. The mapping unit 151 maps each bit in the obtained parity bit sequence for each path to the modulation symbol based on the obtained modulation order. The mapping unit 151 outputs the modulation symbol, to which each bit in the parity bit sequence for each path is mapped, to the perturbation vector addition processing unit 153.

In operation S131, the perturbation vector addition processing unit 153 obtains the modulation symbol, in which the parity bit sequence for each path is modulated, from each mapping unit 151. In certain embodiments, when a symbol length of the modulation symbol, in which the parity bit sequence for each path is modulated, is Np, the perturbation vector addition processing unit 143 obtains an M-dimensional modulation symbol vector sp, of which the symbol length is Np, based on the modulation symbol, in which the parity bit sequence for each path is modulated. Further, the perturbation vector addition processing unit 153 obtains the precoding matrix W calculated based on the estimated channel matrix H.

The perturbation vector addition processing unit 153 searches for a perturbation vector, at which total transmission power after the precoding is minimum, among predetermined perturbation vector candidates based on the obtained modulation symbol vector sp and precoding matrix W. The perturbation vector addition processing unit 153 adds the found perturbation vector to the modulation symbol vector sp. The perturbation vector addition processing unit 153 outputs an M-dimensional modulation symbol vector sp', to which the perturbation vector is added, to the multiplexer 16.

In operation S133, the multiplexer 16 obtains the M-dimensional modulation symbol vector ss', to which the perturbation vector is added, based on the modulation symbol, in which each bit of the information bit sequence is modulated, from the perturbation vector addition processing unit 143 of the information bit processing unit 14. Further, the multiplexer 16 obtains the M-dimensional modulation symbol vector sp', to which the perturbation vector is added, based on the modulation symbol, in which each bit of the parity bit sequence is modulated, from the perturbation vector addition processing unit 153 of the error correction coding processing unit 15.

The multiplexer 16 multiplexes the M-dimensional modulation symbol vector ss' and the M-dimensional modulation symbol vector sp' and outputs the M-dimensional modulation symbol vector s after the multiplexing to the precoding unit 17. Further, the M-dimensional modulation symbol vector s after the multiplexing corresponds to the M-dimensional modulation symbol vector based on the modulation symbol, in which each bit of each of the information bit sequence and the parity bit sequence is modulated.

In operation S135, the precoding unit 17 obtains the M-dimensional modulation symbol vector s based on the modulation symbol, in which each bit of each of the information bit sequence and the parity bit sequence is modulated, from the multiplexer 16.

In operation S137, the precoding unit 17 calculates an average transmission power normalization coefficient $\gamma'_{VP}$ based on the VP method based on the obtained M-dimensional modulation symbol vector s and precoding matrix W by aforementioned Equation 22.

As described above, when the precoding unit 17 calculates the average transmission power normalization coefficient $\gamma'_{VP}$, the precoding unit 17 obtains a transmission signal vector z(k) by multiplying the obtained M-dimensional modulation symbol vector s by the precoding matrix W, and normalizing the multiplication result to the average transmission power normalization coefficient $\gamma'_{VP}$ in operation S137.

In operation S139, the transmission signal vector z(k) obtained as described above, that is, the precoding processed transmission signals of the M paths, is transmitted to the wireless reception device 30 as the RF signals by the transmission antennas Tx1 to TxM of the transmission antenna set Tx, respectively. Further, in certain embodiments, the transmission signal is converted into, for example, a signal of a predetermined wireless frequency band, and transmitted to the wireless reception device 30.

In the above, the example of the series of operations of the wireless transmission device 10 according to the exemplary embodiment of the present disclosure has been described with reference to FIG. 9. Further, the series of aforementioned operations corresponds to one example of an "information processing method."

Further, the series of aforementioned operations is configured by a program for operating a CPU of a device operating each element of the wireless communication device 10. The program is configured to be executed by an operating system (OS) installed in the device. Further, when a device including the element executing the aforementioned processing is readable, a recorded position of the program is not limited. For example, the program is stored in a recording medium accessed from the outside of the device. In certain embodiments, the program is configured to be executed in the CPU of the device by accessing the recording medium, in which the program is stored, to the device.

<4. Summary>

As described above, the wireless transmission device 10 according to the exemplary embodiment of the present disclosure discriminates an information bit sequence from a parity bit sequence, and maps each of the information bit sequence and the parity bit sequence to the modulation symbol. The wireless communication device 10 uses a characteristic that when an error correction code is a systematic code, an information bit is discriminated from a parity bit, so that even when a coding rate is converted into another higher coding rate, an information bit sequence in a coding bit is not changed.

That is, the wireless transmission device 10 according to the exemplary embodiment of the present disclosure first selects an MCS in the same manner as that of the case of the related art using the linear precoding technology and generates an information bit sequence based on a modulation order and a coding rate set in the MCS. Further, the wireless transmission device 10 maps the generated information bit sequence to a modulation symbol, and search for a perturbation vector based on the obtained modulation symbol vector. Further, the wireless transmission device 10 estimates an SINR $\rho_{VP}$ of a reception signal, based on which an improvement quantity of a gain according to an addition of the perturbation vector is expected and re-selects the MCS based on the estimation result.

Accordingly, the wireless transmission device 10 generates a parity bit sequence by coding the information bit sequence based on the re-selected MCS, maps the parity bit sequence to the modulation symbol, and searches for a perturbation vector based on the obtained modulation symbol vector. Further, the wireless transmission device 10 adds the found perturbation vector to the modulation symbol, in which the parity bit sequence is modulated.

Through the aforementioned configuration, the wireless transmission device 10 according to the exemplary embodiment of the present disclosure reflects the improvement quantity of the gain according to the addition of the perturbation vector to a selection of the MCS, that is, a modulation order or a coding rate. Accordingly, the wireless transmission device 10 according to the exemplary embodiment of the present disclosure reduces required transmission power by the addition of the perturbation vector, and further improves a throughput.

Further, when the wireless transmission device 10 according to the exemplary embodiment of the present disclosure calculates the improvement quantity of the gain according to the addition of the perturbation vector, it is enough to map only the information bit sequence to the modulation symbol, and it is not necessary to map the parity bit sequence to the modulation symbol. Accordingly, the wireless transmission device 10 according to the exemplary embodiment of the present disclosure reduces a processing load for the calculation of the improvement quantity of the gain according to the addition of the perturbation vector.

Further, when the information bit sequence is extended according to a re-selection of the MCS, the wireless transmission device 10 according to the exemplary embodiment of the present disclosure executes the processing for mapping the bit to the modulation symbol and the processing for searching for and adding the perturbation vector only for the extended information bit. Accordingly, the wireless communication device 10 reduces a processing load compared to a case of processing mapping the bit to the modulation symbol and processing searching for and adding the perturbation vector are re-executed for the entire information bit sequences after the extension.

By the aforementioned configuration, the wireless transmission device 10 according to the exemplary embodiment of the present disclosure efficiently executes a link adaptation using the non-linear precoding in which the improvement quantity of the gain according to the addition of the perturbation vector is dependent on a transmission symbol.

Further, the wireless transmission device 10 according to the exemplary embodiment of the present disclosure passes on the improvement quantity of the gain according to the addition of the perturbation vector to the selection of a high coding rate (that is, the re-selection of the MCS), so that candidates having higher coding rates (that is, candidates of which coding rates are closer to 1) are prepared as candidates of the MCS. By the aforementioned configuration, the wireless transmission device 10 according to the exemplary embodiment of the present disclosure further improves transmission efficiency.

According to various embodiments, at least some of the devices (for example, modules or functions thereof) or the methods (for example, operations) according to the present disclosure are implemented by a command stored in a computer-readable storage medium in a programming module form. When the command is executed by one or more processors, the one or more processors perform a function corresponding to the command. The computer-readable storage medium is, for example, the memory.

The computer readable recoding medium includes a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions include high class language codes, which can be executed in a computer by using an interpreter, as well as machine codes made by a compiler. The aforementioned hardware device is configured to operate as one or more software modules in order to perform the operation of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for processing a signal, the apparatus comprising:
a processor configured to:
estimate a first Signal-to-Interference plus Noise power Ratio (SINR) of a reception signal based on transmission path information based on a result of an estimation of a plurality of transmission paths and noise power notified from one or more wireless reception devices;
generate a first modulation symbol by modulating an information bit obtained based on a first modulation order and a first coding rate determined based on the first SINR on a basis of the first modulation order;
search for a perturbation vector based on the first modulation symbol generated for each of the plurality of transmission paths, and add the perturbation vector to the first modulation symbol;
estimate a second SINR based on the transmission path information and the first modulation symbol, to which the perturbation vector is added;
calculate an error correction code by coding the information bit based on a second coding rate determined based on the second SINR, and generate a second modulation symbol by modulating the error correction code based on a second modulation order determined based on the second SINR; and
search for a new perturbation vector based on the second modulation symbol generated for each of the plurality of transmission paths; and
add the new perturbation vector to the second modulation symbol; and
a transceiver configured to spatially multiplex and transmit the signal including the information bit and the error correction code to the one or more wireless reception devices from a plurality of antennas through the plurality of transmission paths.

2. The apparatus of claim 1, wherein when the second modulation order is different from the first modulation order, the processor is further configured to re-generate a first modulation symbol by modulating the information bit based on the second modulation order.

3. The apparatus of claim 1, wherein when the second modulation order is the same as the first modulation order, and the second coding rate is larger than the first coding rate, the processor is further configured to:
extend the information bit,
generate a new first modulation symbol by adding a modulation symbol generated by modulating an information bit newly added according to an extension based on the first modulation order to the first modulation symbol, and
code the extended information bit based on the second coding rate to calculate the error correction code.

4. The apparatus of claim 1, wherein the transmission path information is a precoding matrix calculated based on a channel matrix representing the result of the estimation of the plurality of transmission paths.

5. The apparatus of claim 1, wherein the processor is further configured to search for the perturbation vector for each of the first modulation symbol and the second modulation symbol so that transmission power after precoding is reduced.

6. The apparatus of claim 1, wherein the first modulation order and the first coding rate are determined based on a Modulation and Coding Set (MCS) selected based on the first SINR among a plurality of predetermined MCSs, and
the second modulation order and the second coding rate are determined based on an MCS selected based on the second SINR among the plurality of predetermined MCSs.

7. The apparatus of claim 6, wherein the first modulation order and the first coding rate are determined based on the MCS, by which a transmission rate is maximum, among the plurality of predetermined MCSs, in which the first SINR is equal to or smaller than a required SINR of each MCS, among the plurality of predetermined MCSs, and
the second modulation order and the second coding rate are determined based on the MCS, by which a transmission rate is maximum, among the plurality of predetermined MCSs, in which the second SINR is equal to or smaller than the required SINR of each MCS, among the plurality of predetermined MCSs.

8. The apparatus of claim 1, wherein the processor is further configured to generate the signal by multiplying a modulation symbol vector obtained based on the first modulation symbol and the second modulation symbol, to which the perturbation vectors are added, respectively, by the transmission path information, normalizing a result of the multiplication based on a normalization coefficient calculated based on the modulation symbol vector.

9. The apparatus of claim 8, wherein the processor is further configured to transmit the signal to the one or more wireless reception devices from the plurality of antennas through the plurality of transmission paths.

10. The apparatus of claim 9, further comprising the plurality of antennas.

11. A method of processing a signal by a wireless transmission device, the method comprising:
estimating a first Signal-to-Interference plus Noise power Ratio (SINR) of a reception signal based on transmission path information based on a result of an estimation of a plurality of transmission paths and noise power notified from one or more wireless reception devices;

generating a first modulation symbol by modulating an information bit obtained based on a first modulation order and a first coding rate determined based on the first SINR on a basis of the first modulation order;

searching for a perturbation vector based on the first modulation symbol generated for each of the plurality of transmission paths, and adding the perturbation vector to the first modulation symbol;

estimating a second SINR based on the transmission path information and the first modulation symbol, to which the perturbation vector is added;

calculating an error correction code by coding the information bit based on a second coding rate determined based on the second SINR, and generating a second modulation symbol by modulating the error correction code based on a second modulation order determined based on the second SINR; and searching for a new perturbation vector based on the second modulation symbol generated for each of the plurality of transmission paths and adding the new perturbation vector to the second modulation symbol, wherein the wireless transmission device spatially multiplexes and transmits the signal including the information bit and the error correction code to one or more wireless reception devices from a plurality of antennas through the plurality of transmission paths.

12. The method of claim 11, further comprising when the second modulation order is different from the first modulation order, re-generating a first modulation symbol by modulating the information bit based on the second modulation order.

13. The method of claim 11, further comprising:
when the second modulation order is the same as the first modulation order, and the second coding rate is larger than the first coding rate, extending the information bit, generating a new first modulation symbol by adding a modulation symbol generated by modulating an information bit newly added according to the extension based on the first modulation order to the first modulation symbol; and coding the extended information bit based on the second coding rate to calculate the error correction code.

14. The method of claim 11, wherein the transmission path information is a precoding matrix calculated based on a channel matrix representing the result of the estimation of the plurality of transmission paths.

15. The method of claim 11, wherein the perturbation vector is searched for the perturbation vector for each of the first modulation symbol and the second modulation symbol so that transmission power after precoding is reduced.

16. The method of claim 11, wherein the first modulation order and the first coding rate are determined based on a Modulation and Coding Set (MCS) selected based on the first SINR among a plurality of predetermined MCSs, and the second modulation order and the second coding rate are determined based on an MCS selected based on the second SINR among the plurality of predetermined MCSs.

17. The method of claim 16, wherein the first modulation order and the first coding rate are determined based on the MCS, by which a transmission rate is maximum, among the plurality of predetermined MCSs, in which the first SINR is equal to or smaller than a required SINR of each MCS, among the plurality of predetermined MCSs, and the second modulation order and the second coding rate are determined based on the MCS, by which a transmission rate is maximum, among the plurality of predetermined MCSs, in which the second SINR is equal to or smaller than the required SINR of each MCS, among the plurality of predetermined MCSs.

18. The method of claim 11, further comprising generating the transmission signal by multiplying a modulation symbol vector obtained based on the first modulation symbol and the second modulation symbol, to which the perturbation vectors are added, respectively, by the transmission path information, normalizing a result of the multiplication based on a normalization coefficient calculated based on the modulation symbol vector.

19. The method of claim 18, further comprising transmitting the transmission signal to the one or more wireless reception devices from the plurality of antennas through the plurality of transmission paths.

20. A non-transitory computer readable storage medium, in which instructions set to perform one or more operations by a processor are stored, wherein the one or more operations include:

estimating a first Signal-to-Interference plus Noise power Ratio (SINR) of a reception signal based on transmission path information based on a result of an estimation of a plurality of transmission paths and noise power notified from one or more wireless reception devices;

generating a first modulation symbol by modulating an information bit obtained based on a first modulation order and a first coding rate determined based on the first SINR on a basis of the first modulation order;

searching for a perturbation vector based on the first modulation symbol generated for each of the plurality of transmission paths, and adding the perturbation vector to the first modulation symbol;

estimating a second SINR based on the transmission path information and the first modulation symbol, to which the perturbation vector is added;

calculating an error correction code by coding the information bit based on a second coding rate determined based on the second SINR, and generating a second modulation symbol by modulating the error correction code based on a second modulation order determined based on the second SINR; and searching for a new perturbation vector based on the second modulation symbol generated for each of the plurality of transmission paths and adding the new perturbation vector to the second modulation symbol.

* * * * *